(12) United States Patent
Bando et al.

(10) Patent No.: US 12,289,063 B2
(45) Date of Patent: Apr. 29, 2025

(54) MODULAR MULTILEVEL POWER CONVERTER AND VARIABLE SPEED GENERATOR-MOTOR

(71) Applicants: HITACHI MITSUBISHI HYDRO CORPORATION, Tokyo (JP); HITACHI, LTD., Tokyo (JP)

(72) Inventors: Akira Bando, Tokyo (JP); Takahiko Kikui, Tokyo (JP); Kenta Watanabe, Tokyo (JP); Tomomichi Ito, Tokyo (JP); Yasuhiro Kiyofuji, Tokyo (JP); Masakazu Ishikawa, Tokyo (JP); Yosuke Nakaide, Tokyo (JP)

(73) Assignees: HITACHI MITSUBISHI HYDRO CORPORATION, Tokyo (JP); HITACHI, LTD., Tokyo (JP)

( * ) Notice: Subject to any disclaimer, the term of this patent is extended or adjusted under 35 U.S.C. 154(b) by 268 days.

(21) Appl. No.: 18/026,111

(22) PCT Filed: Sep. 18, 2020

(86) PCT No.: PCT/JP2020/035637
§ 371 (c)(1),
(2) Date: Mar. 13, 2023

(87) PCT Pub. No.: WO2022/059211
PCT Pub. Date: Mar. 24, 2022

(65) Prior Publication Data
US 2023/0369988 A1    Nov. 16, 2023

(51) Int. Cl.
*H02M 7/483* (2007.01)
*H02M 1/00* (2006.01)
*H02M 1/32* (2007.01)

(52) U.S. Cl.
CPC ....... *H02M 7/4835* (2021.05); *H02M 1/0048* (2021.05); *H02M 1/32* (2013.01)

(58) Field of Classification Search
CPC .. H02M 7/4835; H02M 7/483; H02M 7/4807; H02M 7/02; H02M 7/10;
(Continued)

(56) References Cited

U.S. PATENT DOCUMENTS

| 7,960,871 | B2 | 6/2011 | Dommaschk et al. |
| 8,144,489 | B2 | 3/2012 | Dommaschk et al. |

(Continued)

FOREIGN PATENT DOCUMENTS

| EP | 3264583 A1 | 1/2018 |
| JP | 4999930 B2 | 8/2012 |

(Continued)

OTHER PUBLICATIONS

Extended European Search Report issued in the corresponding European patent Application No. 20954196.0 dated May 27, 2024.
(Continued)

*Primary Examiner* — Nguyen Tran
(74) *Attorney, Agent, or Firm* — Rimon P.C.

(57) ABSTRACT

A modular multilevel power converter includes: a capacitor voltage adjuster that calculates an active current component command to make an average voltage of capacitors match a command value; an active power detector that receives an AC current signal and an AC voltage signal and calculates an active power; an active power adjuster that calculates a DC current command value to make the active power match a command value; a first active power command suppressor that suppresses an absolute value of an active power command value; and a second active power command suppressor that adjusts an absolute value of an active power command value.

6 Claims, 20 Drawing Sheets

(58) Field of Classification Search
CPC .. H02M 7/043; H02M 1/0048; H02M 1/0043; H02M 1/0045; H02M 1/32; H02M 1/36; H02M 1/38; H02M 1/42

See application file for complete search history.

(56) References Cited

U.S. PATENT DOCUMENTS

| | | | |
|---|---|---|---|
| 8,233,300 | B2 | 7/2012 | Dommaschk et al. |
| 10,164,435 | B2* | 12/2018 | Chung .................. H02J 3/1857 |
| 10,536,104 | B2 | 1/2020 | Bando et al. |
| 10,784,808 | B2 | 9/2020 | Bando et al. |
| 11,223,310 | B2* | 1/2022 | Bando ..................... H02M 1/12 |
| 2014/0078796 | A1 | 3/2014 | Inoue et al. |
| 2017/0047860 | A1 | 2/2017 | Fujii et al. |
| 2018/0034399 | A1* | 2/2018 | Bando ....................... H02P 9/04 |

FOREIGN PATENT DOCUMENTS

| | | |
|---|---|---|
| JP | 5189105 B2 | 4/2013 |
| JP | 5197623 B2 | 5/2013 |
| JP | 5993675 B2 | 9/2016 |
| JP | 2017-143626 A | 8/2017 |
| JP | 6243083 B2 | 12/2017 |
| WO | 2015/178376 A1 | 11/2015 |

OTHER PUBLICATIONS

A. Moawwad, et al., "Novel Configuration and Transient Management Control Strategy for VSC-HVDC," IEEE Transactions on Power Systems, vol. 29, No. 5, pp. 2478-2488, Sep. 2014, doi: 10.1109/TPWRS.2014.2305984.

Wen, Hao & Fazeli, Meghdad, "A new control strategy for low-voltage ride-through of three-phase grid-connected PV systems", The Journal of Engineering, 2019. vol. 2019, Issue 18, pp. 4900-4905.

D. Jovcic. et al., "Low-Energy Protection System for DC Grids Based on Full-Bridge MMC Converters," IEEE Transactions on Power Delivery, vol. 33, No. 4, pp. 1934-1943, Aug. 2018, doi: 10.1109/TPWRD.2018.2791635.

W. Han et al., "A Three-Terminal Hybrid HVDC System based on LCC and Hybrid MMC with DC Fault Clearance Capability," 2019 10th International Conference on Power Electronics and ECCE Asia (ICPE 2019—ECCE Asia), Busan, Korea (South), 2019, pp. 1-7, doi: 10.23919/ICPE2019-ECCEAsia42246.2019.8796937.

International Search Report issued in corresponding International Patent Application No. PCT/JP2020/035637, dated Dec. 1, 2020.

Ahmed Zama, "Modeling and Control of Modular Multilevel Converters (MMCs) for HVDC applications," Nov. 2018, Figure III-40, p. 111.

* cited by examiner

MODULAR MULTILEVEL POWER CONVERTER AND VARIABLE SPEED GENERATOR-MOTOR

CROSS-REFERENCE OF RELATED APPLICATIONS

This application is the U.S. National Phase under 35 U.S.C. § 371 of International Patent Application No. PCT/JP2020/035637, filed on Sep. 18, 2020, the entire disclosures of which Applications are incorporated by reference herein.

FIELD

The present invention relates to a modular multilevel power converter (hereinafter, referred to as an "MMC converter" in the present invention). In particular, the present invention relates to a variable speed generator-motor in which the DC sides of two MMC converters are connected back-to-back to form a frequency converter, an AC side of one of the MMC converters is connected to a power system, and an AC side of the other MMC converter is connected to an AC rotary electric machine.

BACKGROUND

The circuit of the MMC converter includes a unit converter that generates a required voltage by controlling modulation factors of PWM converters using energy storage elements having a voltage source characteristic, such as capacitors, as voltage sources. The voltage of the energy storage element of the unit converter fluctuates by charging and discharging at a cycle determined by the AC frequency. Six two-terminal arms in each of which the unit converters are connected in series are provided, three of them are defined as positive-side arms, first terminals are connected to the respective phase terminals of the AC power supply, and second terminals in the star connection is connected to the positive-side terminal of the DC power supply. The remaining three arms are negative-side arms, the second terminals of the negative-side arms are connected to the respective phase terminals of the AC power supply, and the star-connected first terminals are connected to the negative-side terminals of the DC power supply. An inductive element that suppresses a current penetrating from the negative-side arm to the positive-side arm of each phase is provided.

The control of the MMC converter includes a function of calculating an AC current command and a DC current command according to an operation command from the outside (hereinafter, referred to as a "host control device" in the present invention), a current control function of adjusting arm currents according to a command from the host control device (hereinafter, referred to as "converter current control" in the present invention), a function of maintaining an average voltage of the energy storage elements in balance between the unit converters by mutually adjusting modulation factors of the PWM converters provided in the unit converters (hereinafter, referred to as "inter-stage control" in the present invention), and a function of maintaining an average voltage of the energy storage elements in the arms in balance between the arms (hereinafter, referred to as "inter-phase balance control" in the present invention).

Patent Literature 1 discloses a basic circuit configuration of an MMC converter.

Patent Literature 2 discloses a basic control configuration of an MMC converter.

Patent Literature 3 discloses a method for maintaining balance between capacitor voltages of unit converters included in an MMC converter.

Patent Literature 4 discloses a method of achieving a variable speed generator-motor by connecting an AC side of one of two MMC converters having the DC sides connected back-to-back to an AC rotary electric machine.

Non Patent Literature 1 comprehensively provides a functional block diagram of a conceptual host control device.

Patent Literature 5 explicitly provides a functional block diagram of a practical host control device.

CITATION LIST

Patent Literature

Patent Literature 1: Japanese Patent No. 5189105
Patent Literature 2: Japanese Patent No. 5197623
Patent Literature 3: Japanese Patent No. 4999930
Patent Literature 4: Japanese Patent No. 6243083
Patent Literature 5: Japanese Patent No. 5993675

Non Patent Literature

Non Patent Literature 1: Ahmed ZAMA, 'Modeling and Control of Modular Multilevel Converters(MMCs) for HVDC applications', November 2018, Figure III-40, p. 111

SUMMARY

Technical Problem

An MMC converter has a disadvantage that the volume per output capacity is larger than that of a conventional three-level converter or the like. This is an issue particularly when an MMC converter is used for an application with severe installation area and volume restrictions, such as pumped-storage power plants which are often installed underground and offshore wind power plants.

A cause of an increase in size of an MMC converter is capacitors used as energy storage elements. In a conventional MMC converter, capacitors often occupy more than half of the arm volume. Although the capacitors can be downsized by reducing the stored energy of the capacitors, an increase in voltage pulsation due to charging and discharging at a cycle determined by the AC frequency is a bottleneck.

FIG. 17 illustrates a relationship between the capacitor capacity and the voltage pulsation. The capacitor capacity coefficient Kc on the horizontal axis is a value obtained by dividing the energy when all the capacitors are charged at the rated voltage by the rated active power output of the MMC converter to obtain the time constant [sec] and then by unitizing the time constant into one cycle of the AC frequency. The frequency of the AC system is represented by F0, the rated output (active power) of the MMC converter is represented by P0, and the six arms included in the MMC converter each include K unit converters connected in series.

Here, when the capacitor capacity of the unit converter is represented by C and the rated voltage of the capacitor is represented by V0, Kc is expressed by Mathematical formula (1).

Mathematical formula 1

$$Kc = \frac{6 \times K \times \left(\frac{1}{2} C \cdot V0^2\right)}{P0} \times F0 \quad (1)$$

In FIG. 17, the vertical axis represents the voltage pulsation factor r, and the maximum value Vc_max, the average value Vc_ave, and the minimum value Vc_min of the capacitor voltage.

Here, the pulsation factor r is a unitized dimensionless number and defined as follows.

$$r = (Vc\_max - Vc\_min)/(Vc\_max + Vc\_min)$$

The voltages Vc_max, Vc_ave, and Vc_min indicate values unitized by the capacitor rated voltage V0.

When an MMC converter is designed, the maximum voltage value Vc_max is adjusted to be the rated voltage V0 in order to maximize the voltage utilization of the capacitor. FIG. 17 illustrates changes in the voltage pulsation factor r, the average value Vc_ave, and the minimum value Vc_min after adjustment.

FIG. 17 illustrates a case where the frequency F0 of the AC system is 60 Hz and the MMC converter has a power factor of 0.85, which is relatively high. In general, the values of the vertical axis are higher as the power factor is lower. However, the tendencies of the voltage pulsation factor r, the average value Vc_ave, and the minimum value Vc_min with respect to the capacitor capacity coefficient Kc do not change.

When the capacitor capacity is lowered, the DC rated voltage of the MMC converter is lowered in proportion to the capacitor average voltage Vc_ave, and it is necessary to increase the DC rated current in inverse proportion. This leads to an increase in the current capacity of the self-arc-extinguishing element and the anti-parallel diode included in a unit converter. When the capacitor capacity is further lowered, the balance of the capacitor voltages of the K unit converters included in the arm is easily disturbed, and the operation cannot be continued due to disturbance such as AC voltage power supply fluctuation due to system fault propagation.

When comparing the sizes and volumes of the MMC converter and the conventional three-level converter, the comparison result differs depending on whether the comparison is performed with an accessory facility unnecessary for the MMC converter such as a harmonic filter included or without any accessory. In addition, the MMC converter can reduce the generation loss to about 50% as compared with the conventional three-level converter, so that the cooling device can be downsized. Therefore, the comparison result differs depending on whether the cooling device is included. However, the size of the cooling device varies greatly depending on whether the refrigerant is water or air.

Here, comparison is performed including the harmonic filter, and excluding the cooling device. In order to suppress the size and volume of the MMC converter to be similar to those of the conventional three-level converter under this condition, it is necessary to allow a capacitor voltage pulsation factor of the MMC converter exceeding 10%. Alternatively, the above-described capacitor capacity coefficient Kc needs to be set to a value smaller than 3.

If the capacitor capacity is increased to suppress the voltage pulsation factor to about 5 to 8%, the control of the MMC converter becomes remarkably easy. On the other hand, since the device volume increases substantially in proportion to the capacitor capacity coefficient Kc on the horizontal axis in FIG. 17, the device volume becomes so large that it cannot be compared with the conventional three-level converter.

In particular, in a case where the AC side of one of two MMC converters having the DC sides connected back-to-back is connected to the AC rotary electric machine and the MMC converters are applied to a pumped-storage generator-motor or a wind power generator, the configuration of the MMC converters on the premise of being directly connected to the loop power grid is not appropriate because these facilities are often located at the trailing end of the power system. In the case of the trailing end connection, disturbance such as ground fault propagation on the AC system side is large, and it is necessary to continue the operation in an open phase state (two-phase operation) during a period from removal of the ground fault phase after an asymmetric fault to reclosing. These functions are functions that are naturally required for a conventional fixed speed power generation facility as a major premise of a power generation facility.

In a case where an MMC converter is used, and further, in a case where the capacitor capacity is suppressed to reduce the size and weight, the balance of the capacitor voltages is easily disturbed upon system fault propagation, so that it is difficult to achieve a function of continuing the operation maintaining the balance of the capacitor voltages particularly upon an asymmetric fault.

The present invention is suitable for resolving the issue in the event of system fault propagation while reducing the size and weight of the MMC converters by adjustment into the range indicated by the arrows in FIG. 17. Specifically, the range is, for example, "the capacitor capacity coefficient Kc is 3 or less" or "the capacitor voltage pulsation factor r is 10% or more".

An object of the present invention is to resolve the above-described issue and achieve both low loss, which is an advantage of an MMC converter, and reduce of the size of the device and improvement of operation continuation performance in the event of system fault propagation, which are disadvantages of an MMC converter.

Solution to Problem

In order to resolve the above-described issues and achieve the object, provided is an MMC converter suitable for adjusting an active current component of an MMC converter using an average voltage of capacitors of unit converters included in the MMC converter, suppressing a DC current command of the MMC converter when a positive-phase voltage decreases or a negative-phase voltage increases in a case of a system fault, and continuing operation in a case of system fault propagation.

Hereinafter, means for implementing these functions will be described.

FIG. 18 illustrates a configuration of an MMC converter 60 using a three-terminal reactor of Patent Literature 4. The MMC converter 60 is connected to an AC system 2 via a unit transformer 4, and a signal transformer 5 including three voltage transformers and three current transformers is provided between first terminals (AT, BT, and CT) of the unit transformer 4 and the AC system 2. The DC power supply 3 is connected to DC side terminals (P and N) of the MMC converter 60. The DC side terminals (P and N) of the MMC converter 60 are grounded through high resistors 8 (8P and 8N) and their potentials are fixed, and a DC voltage (VDC_fB) is differentially measured by current transformers 9 (9P and 9N).

Three two-terminal positive-side arms 7P are provided between second terminals (U, V, and W) of the unit transformer 4 and the positive-side DC terminal P, three two-terminal negative-side arms 7N are provided between the AC terminals U, V, and W and the negative-side DC terminal N, and current transformers 10 are provided between the AC terminals U, V, and W and the first terminals of the positive-side arms 7P and between the AC terminals U, V, and W and the second terminals of the negative-side arms 7N.

Between AC terminals (U, V, and W) of the respective phases, the first terminals of the positive-side arms 7P, and the second terminals of the negative-side arms 7N, three-terminal reactors 6U, 6V, and 6W are provided. The AC terminals (U, V, and W) of the respective phases are connected to intermediate terminals (UC, VC, and WC) of the three-terminal reactors 6 (6U, 6V, and 6W), the first terminals of the three positive-side arms 7P are connected to the positive-side terminals (UP, VP, and WP) of the three-terminal reactors 6, and the second terminals of the three negative-side arms 7N are connected to the negative-side terminals (UN, VN, and WN) of the three-terminal reactors 6.

With the above configuration, the converter current control device 11 receives detection currents (IP_U, IP_V, IP_W, IN_U, IN_V, and IN_W) of the current transformers 10, and calculates AC currents (IAC_U, IAC_V, and IAC_W) and through currents (IPN_U, IPN_V, and IPN_W) flowing from the negative-side arms 7N to the positive-side arms 7P of the respective phases by the following mathematical formulas.

$IAC\_U = IP\_U + IN\_U$ $IAC\_V = IP\_V + IN\_V$ $IAC\_W = IP\_W + IN\_W$ $IPN\_U = (1/2) \times (IP\_U - IN\_U)$ $IPN\_V = (1/2) \times (IP\_V - IN\_V)$ $IPN\_W = (1/2) \times (IP\_W - IN\_W)$ The converter current control device 11 receives the AC currents and the through currents, and outputs gate pulses via the terminals C of the two-terminal positive-side arms 7P and the two-terminal negative-side arms 7N.

Hereinafter, a configuration of a host control device will be described based on Non Patent Literature 1, and a configuration of converter current control will be described based on Patent Literature 4.

Reference numeral 19 denotes an AC signal calculation unit that receives a voltage/current signal from the signal transformer 5 and calculates and outputs an active power (P_fB), a reactive power (Q_fB), and a positive-phase voltage phase (θp).

Reference numeral 23 denotes a DC power detector that calculates a DC power (Pdc_fB) from the DC voltage (Vdc_fB) and the P-side arm currents (IP_U, IP_V, and IP_W) by the following mathematical formulas.

$IDC = IP\_U + IP\_V + IP\_W$ $Pdc\_fB = VDC\_fB \times IDC$

Reference numeral 61 denotes an MMC converter energy detector that receives the capacitor voltages of the unit converters of the six arms 7 (the positive-side arms 7P and the negative-side arms 7N) and calculates the total value (Wmmc_fB) of the energies stored in all the capacitors.

Reference numeral 62 denotes a host control device that compares an active power command (P_ref), a reactive power command (Q_ref), and a DC voltage command (VDC_ref) from the outside with the measurement values (P_fB, Q_fB, and VDC_fB) and outputs current command values (Id_ref, Iq_ref, and Iz_ref) to the converter current control device 11.

The relationship between the current command values (Id_ref and Iq_ref), the AC current commands (IAC_U_ref, IAC_V_ref, and IAC_W_ref), and the positive-phase voltage phase (θp) is expressed by Mathematical formula (2).

Mathematical formula 2

$$\begin{bmatrix} IAC\_U\_ref \\ IAC\_V\_ref \\ IAC\_W\_ref \end{bmatrix} = \begin{bmatrix} \cos(\theta p) & \sin(\theta p) \\ \cos\left(\theta p - \frac{2}{3}\pi\right) & \sin\left(\theta p - \frac{2}{3}\pi\right) \\ \cos\left(\theta p + \frac{2}{3}\pi\right) & \sin\left(\theta p + \frac{2}{3}\pi\right) \end{bmatrix} \begin{bmatrix} Iq\_ref \\ Id\_ref \end{bmatrix} \quad (2)$$

In addition, the relationship between the current commands (IP_U_ref, IP_V_ref, and IP_W_ref) of the positive-side arms, the current commands (IN_U_ref, IN_V_ref, and IN_W_ref) of the negative-side arms, the AC current commands (IAC_U_ref, IAC_V_ref, and IAC_W_ref), and the DC current command (Iz_ref) is expressed by the following mathematical formulas.

$IP\_U\_ref = (1/2) \times IAC\_U\_ref + Iz\_ref$ $IP\_V\_ref = (1/2) \times IAC\_V\_ref + Iz\_ref$ $IP\_W\_ref = (1/2) \times IAC\_W\_ref + Iz\_ref$ $IN\_U\_ref = (1/2) \times IAC\_U\_ref - Iz\_ref$ $IN\_V\_ref = (1/2) \times IAC\_V\_ref - Iz\_ref$ $IN\_W\_ref = (1/2) \times IAC\_W\_ref - Iz\_ref$ FIG. 19 illustrates a comprehensive configuration of the host control device 62 described in Non Patent Literature 1. The host control device 62 distributes and outputs the output of a converter energy adjustment unit (AWmmcR) 63 to an AC active power adjustment unit (APacR) 66 and a DC active power adjustment unit (APdcR) 67 at a gain 65 and a gain 64.

The output of the DC voltage adjustment unit (AVdcR) 68 can be switched to the active power command (P_ref) by a switch 69 by a mode switching command, and is distributed and output to the AC active power adjustment unit (APacR) 66 and the DC active power adjustment unit (APdcR) 67.

A reactive power adjustment unit (AQR) 70 outputs the reactive current command (Id_ref), the AC active power adjustment unit (APacR) 66 outputs the active current command (Iq_ref), and the DC active power adjustment unit (APdcR) 67 outputs the DC current command (Iz_ref).

A switch (SW_ac1) 71, a switch (SW_dc1) 72, a switch (SW_ac2) 73, and a switch (SW_dc2) 74 are not described in Non Patent Literature 1, but are added to describe the features of the present invention. In addition, a gain 75 and a gain 76 are added to clearly indicate unit conversion.

Non Patent Literature 1 describes that adjustment of the gain 64 and the gain 65, and the switch 69 allows flexible switching of the operation of the control system and flexible adjustment, according to the operation mode.

Non Patent Literature 1 asserts that there is an option of controlling the outputs of the active current command (Iq_ref) and the DC current command (Iz_ref) comparing the outputs with any of the AC current active power (P_fB), the DC current voltage (VDC_fB), and the total value (Wmmc_fB) of the all capacitor energies, or a combination thereof.

On the other hand, an object of the present invention is to reduce the capacitor capacity of a unit converter, and an MMC converter having the voltage pulsation factor r exceeding 10% is targeted. At the same time, an object of the present invention is to achieve a control method that can stably continue operation even against disturbance on the AC system side such as disturbance in the event of system fault propagation. It has been found that as a large voltage pulsation factor r is accepted, options of the control methods are narrowed, and in particular, the control method of the active current command (Iq_ref) is limited.

In the event of system fault propagation, the behavior differs depending on the active power converted by the MMC converter connected to the system is in the power generation direction (hereinafter, referred to as "power generation operation") and the electric operation direction (hereinafter, the operation is referred to as "electric operation"). In addition, the behavior differs depending on whether the system fault mode is a symmetric fault or an asymmetric fault.

It has been found that for the MMC converter, an issue is to continue the operation while maintaining the voltage balance between the capacitors at the time of an asymmetric fault occurring in electric operation, particularly during an open-phase operation of two-phase power supply from removal of the fault phase to reclosing.

In the present invention, in the host control device 62, the switch 69 is fixed to the p side, the switch (SW_ac1) 71 and the switch (SW_dc2) 74 are fixed to the open side for disconnection, the switch (SW_dc1) 72 and the switch (SW_ac2) 73 are fixed to the close side for short-circuit, the gain 64 is fixed to $\alpha w=0$ (equivalent to "fixed to the open side"), and the gain 65 is fixed to $(1-\alpha w)=1$ (equivalent to "fixed to the close side"). As a result, the active current command (Iq_ref) is output by the converter energy adjustment unit (AWmmcR) 63.

It has been found that the above-described configuration is suitable for resolving the issue.

With the above-described configuration, system fault propagation is detected from the positive-phase voltage drop and the negative-phase voltage rise of the AC system, and the DC current command (Iz_ref) upon detection is suppressed, so that the imbalance between the capacitor voltages is suppressed. Thus, the configuration has an effect of achieving operation continuation in the event of system fault propagation.

As another option, the host control device 62 may be configured as illustrated in FIG. 20 in which the switch (SW_ac2) 73 is fixed to the open side for disconnection, the switch (SW_ac1) 71, the switch (SW_dc1) 72, and the switch (SW_dc2) 74 are fixed to the close side for short-circuit, the gain 64 is fixed to $\alpha w=1$ (equivalent to "fixed to the close side"), and the gain 65 is fixed to $(1-\alpha w)=0$ (equivalent to "fixed to the open side"). In this case, the active current command (Iq_ref) is controlled by the AC active power adjustment unit (APacR) 66, and the DC current command (Iz_ref) is controlled by the converter energy adjustment unit (AWmmcR) 63.

The host control device 62 configured as described above outputs the DC current command (Iz_ref) only by the converter energy adjustment unit (AWmmcR) 63 although the active power command (P_ref) is added, so that the capacitor stored energy can be adjusted at a high speed.

On the other hand, the capacitor stored energy cannot be adjusted according to the set value due to the active power command (P_ref) to be added, and it is necessary to take a likelihood equal to or more than the capacitor voltage corresponding to the deviation from the set value, causing an increase in size of the device, which is disadvantageous.

As a method of eliminating the deviation from the set value of the capacitor stored energy for prevention of increase in size of the device, in the configuration of FIG. 20, the switch (SW_dc2) 74 may be fixed to the open side so that the DC active power adjustment unit (APdcR) 67 is operated.

However, according to this method, the DC active power adjustment unit (APdcR) 67 is added, as a feedback adjustment unit, inside the converter energy adjustment unit (AWmmcR) 63, so that the response speed of the converter energy adjustment unit (AWmmcR) 63 has to be lowered. As a result, adjustment of the capacitor stored energy is delayed in the event of system fault propagation, and the balance of the capacitor voltages cannot be maintained, which is disadvantageous.

As described above, the configuration options of the host control device 62 are limited. In the present invention, as described above, the switch 69 is fixed to the p side, the switch (SW_ac1) 71 and the switch (SW_dc2) 74 are fixed to the open side for disconnection, the switch (SW_dc1) 72 and the switch (SW_ac2) 73 are fixed to the close side for short-circuit, the gain 65 is fixed to $(1-\alpha w)=1$ (equivalent to "fixed to the close side"), and the gain 64 is fixed to $\alpha w=0$ (equivalent to "fixed to the open side").

In addition, in Non Patent Literature 1, the converter energy adjustment unit (AWmmcR) 63 adjusts the stored energies of all capacitors. This is equivalent to adjusting the root mean square value of the voltage values of all capacitors. The stored energies of the capacitors fluctuate according to the AC system frequency, and the total value of the stored energies of all capacitors also fluctuates similarly. It is therefore necessary to input the stored energies into the converter energy adjustment unit (AWmmcR) 63 after making the stored energies pass through a low-pass filter such as moving average.

On the other hand, Patent Literature 5 discloses a method of inputting an average value of all capacitor voltages. In the present invention, in order to suppress the capacitor capacity, voltage pulsation of more than 10% is assumed at the rated output of the device. As the voltage pulsation increases, the difference between the arithmetic mean voltage and the root mean square voltage of the capacitors also increases. Therefore, there is a possibility that the method of Patent Literature 5 cannot be used.

FIG. 21 illustrates a result of comparing the one-cycle averages of the AC system for the arithmetic mean voltage and the root mean square voltage of the capacitors. FIG. 21 illustrates a result of the comparison in a case where 12 unit converters are connected in series per arm (K=12), that is, 72 capacitor voltages as a total for 6 arms. The difference between them is only about 0.4%. As described above, it has been found that the method of Patent Literature 5 is also effective for the present invention.

Hereinafter, in the present invention, a capacitor voltage adjustment unit (AVcR) is used instead of the converter energy adjustment unit (AWmmcR) of Non Patent Literature 1. This provides an effect of stably adjusting the capacitor voltages at a high speed.

Advantageous Effects of Invention

The modular multilevel power converter according to the present invention can achieve both reducing the size of the device and securing operation continuation performance in the event of system fault propagation.

DESCRIPTION OF EMBODIMENTS

Hereinafter, embodiments of a modular multilevel power converter and a variable speed generator-motor according to the present invention will be described in detail with reference to the drawings. Note that the present invention is not limited by the embodiments.

First Embodiment

Figure 1:
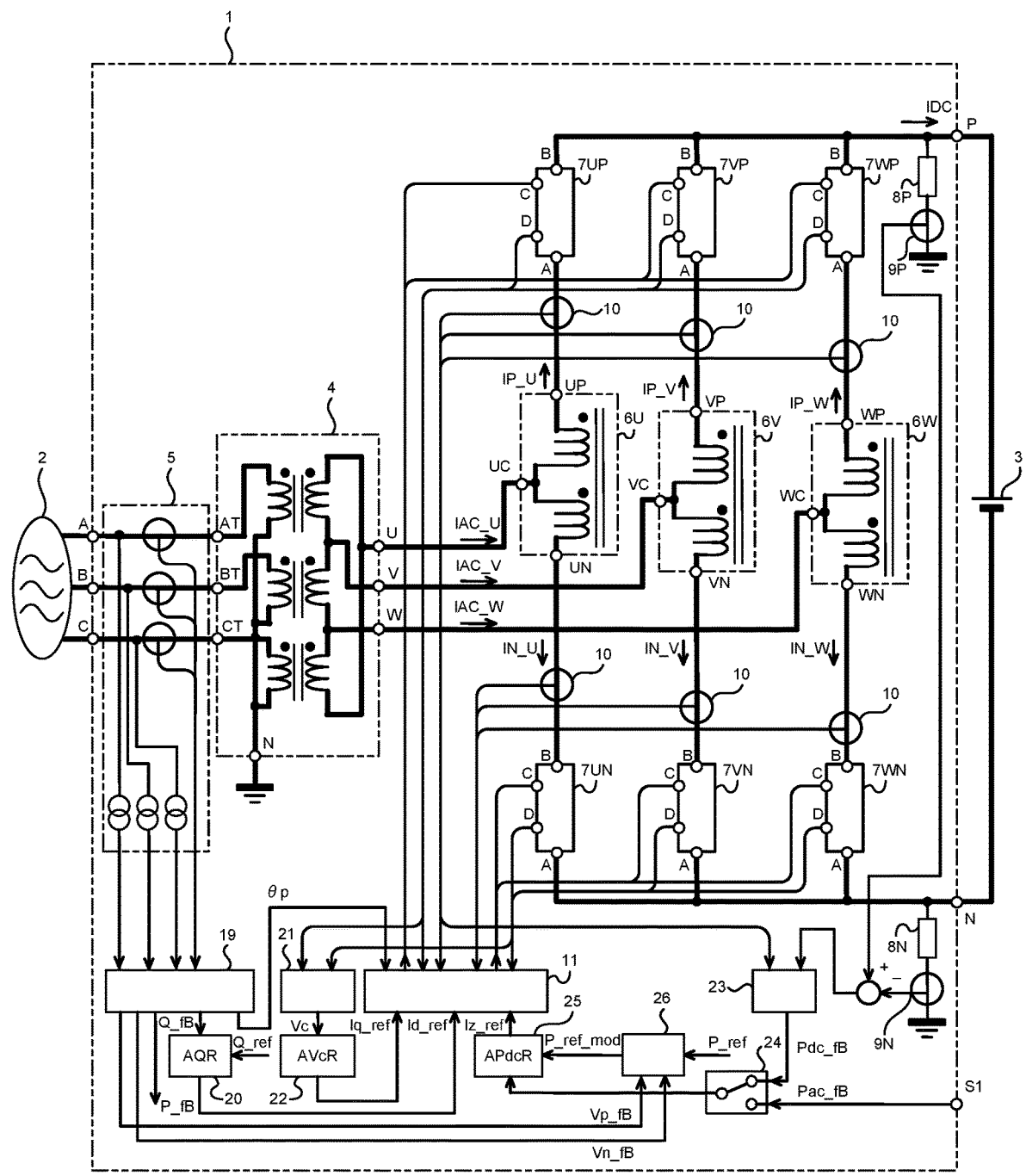
FIG. 1 is a diagram illustrating a circuit configuration of a first embodiment of an MMC converter according to the present invention.
Figure 18:
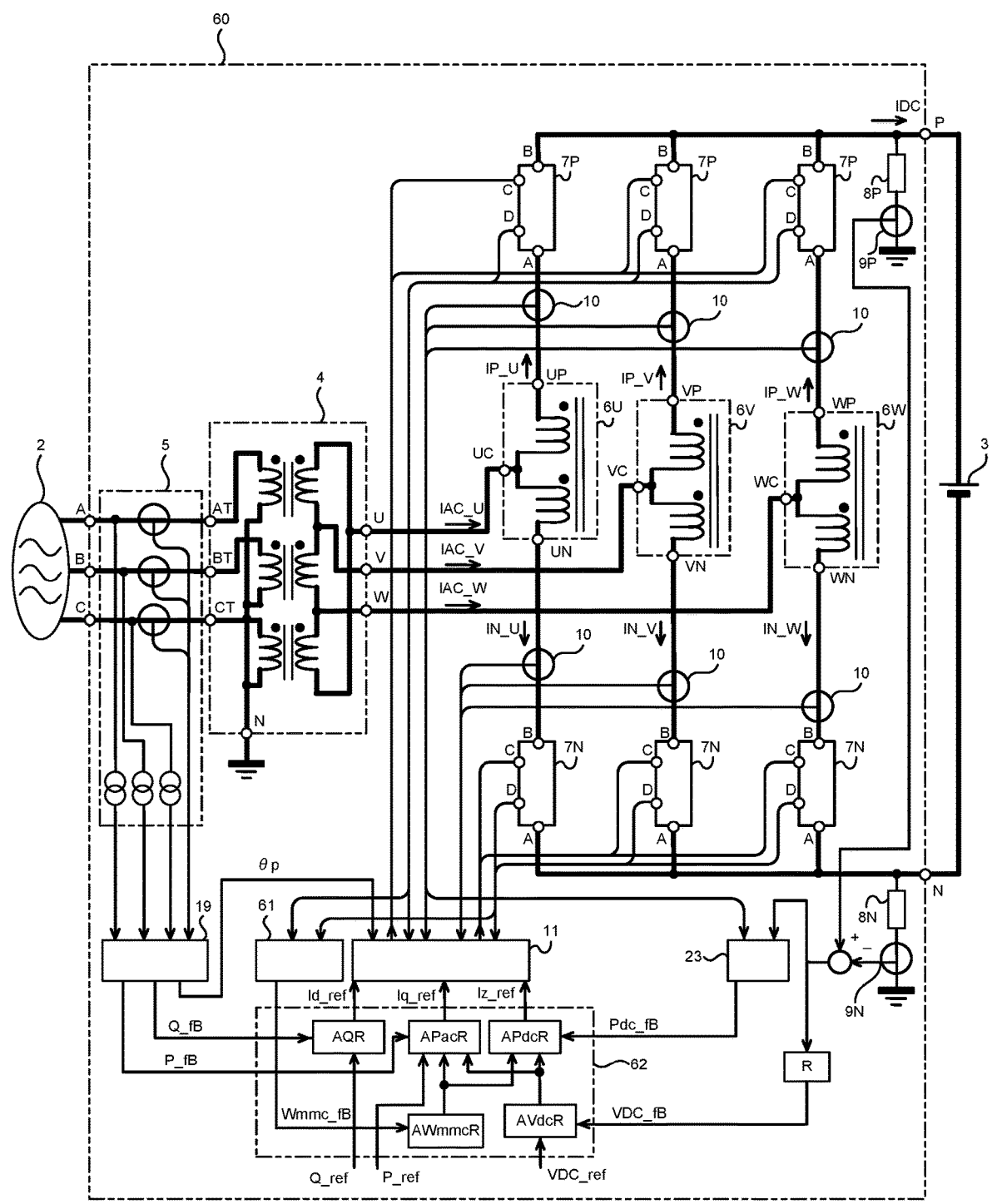
FIG. 18 is a diagram illustrating a configuration of a conventional MMC converter.
Figure 19:
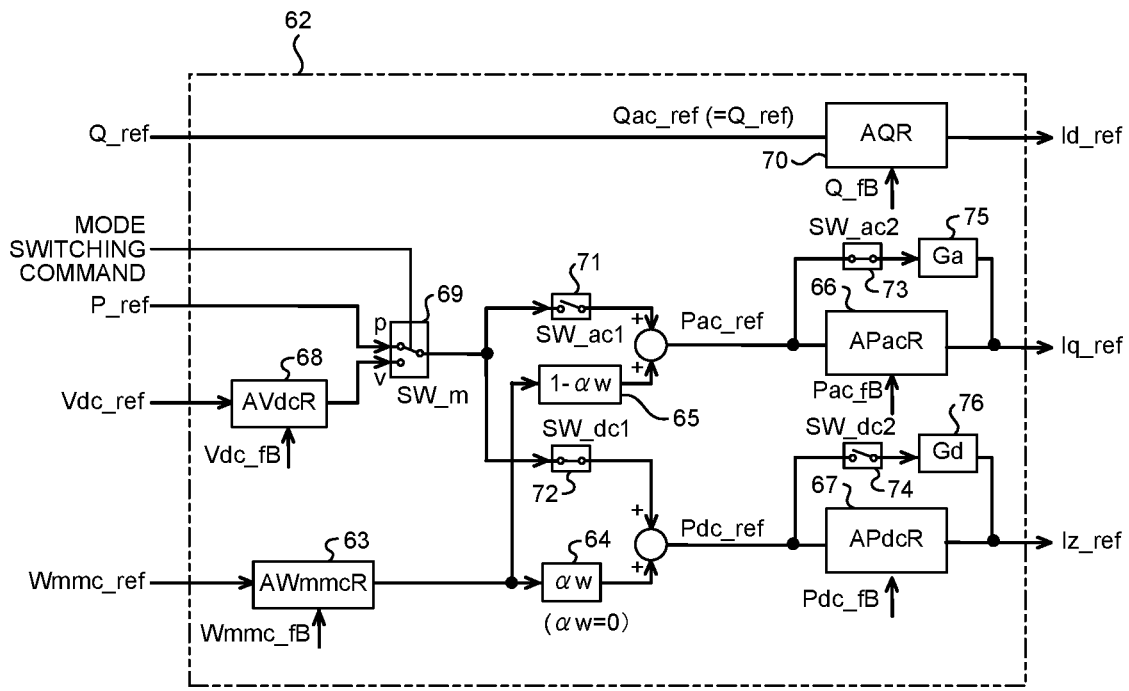
FIG. 19 is a diagram illustrating a relationship between a configuration of a host control system of a conventional MMC converter and the present invention.
Figure 20:
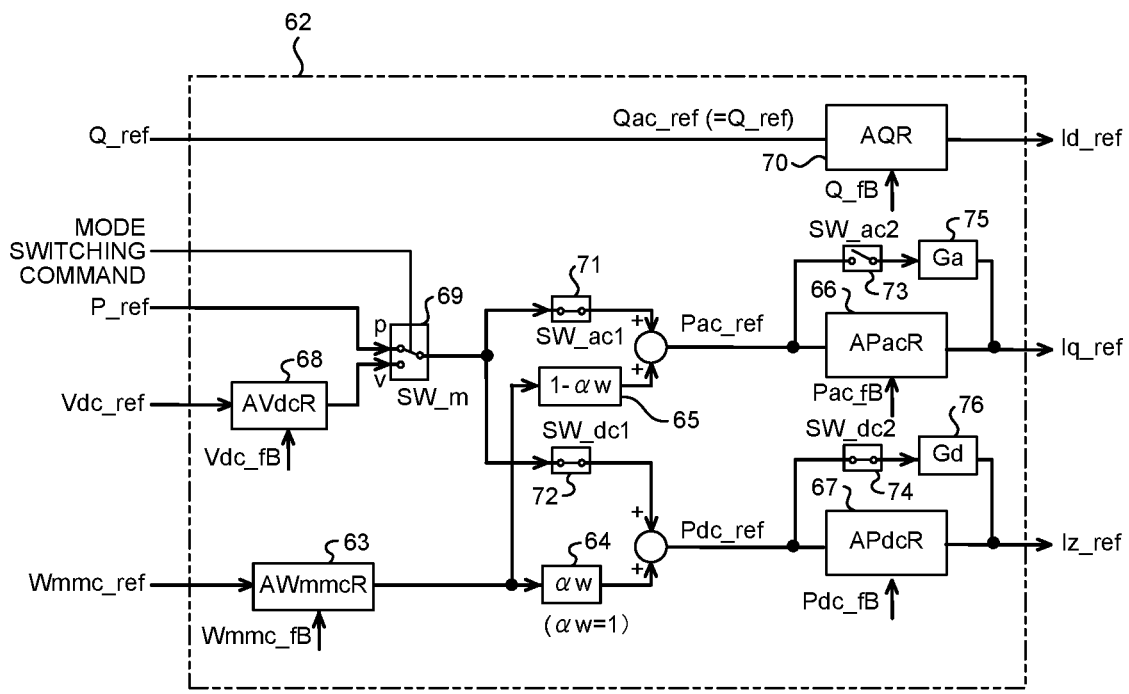
FIG. 20 is a diagram illustrating another configuration of the host control system of the conventional MMC converter.
Figure 21:
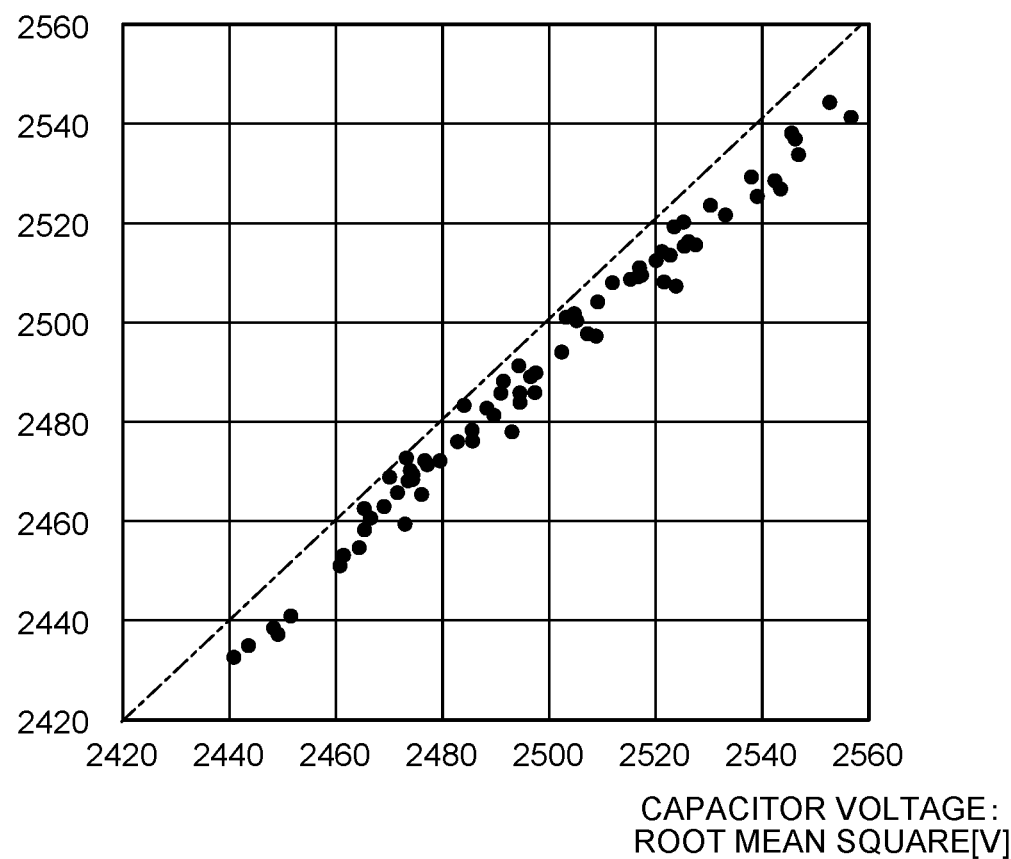
FIG. 21 is a diagram illustrating a correlation between a root mean square value and an arithmetic mean value for a one-cycle average value of the voltage of a capacitor included in a unit converter of an MMC converter.

FIG. 1 is a diagram illustrating a circuit configuration of a first embodiment of a modular multilevel power converter (hereinafter, referred to as an MMC converter) according to the present invention. In FIG. 1, the same components as those of the MMC converter 60 illustrated in FIG. 18 and described above are denoted by the same reference numerals. The same components as those of the MMC converter 60 will not be described in order to avoid duplication.

Reference numeral 1 denotes an MMC converter that is connected to an AC system 2 via a unit transformer 4 and is connected to a DC power supply 3 at DC side terminals (P and N).

Between AC terminals (U, V, and W) of the respective phases, first terminals of positive-side arms (7UP, 7VP, and 7WP), and second terminals of negative-side arms (7UN, 7VN, and 7WN), three-terminal reactors 6U, 6V, and 6W are provided.

Reference numeral 10 denotes a current transformer that detects currents (IP_U, IP_V, IP_W, IN_U, IN_V, and IN_W) of six coils included in the three-terminal reactor 6U, 6V, and 6W, and outputs the currents to a converter current control device 11.

Figure 2:
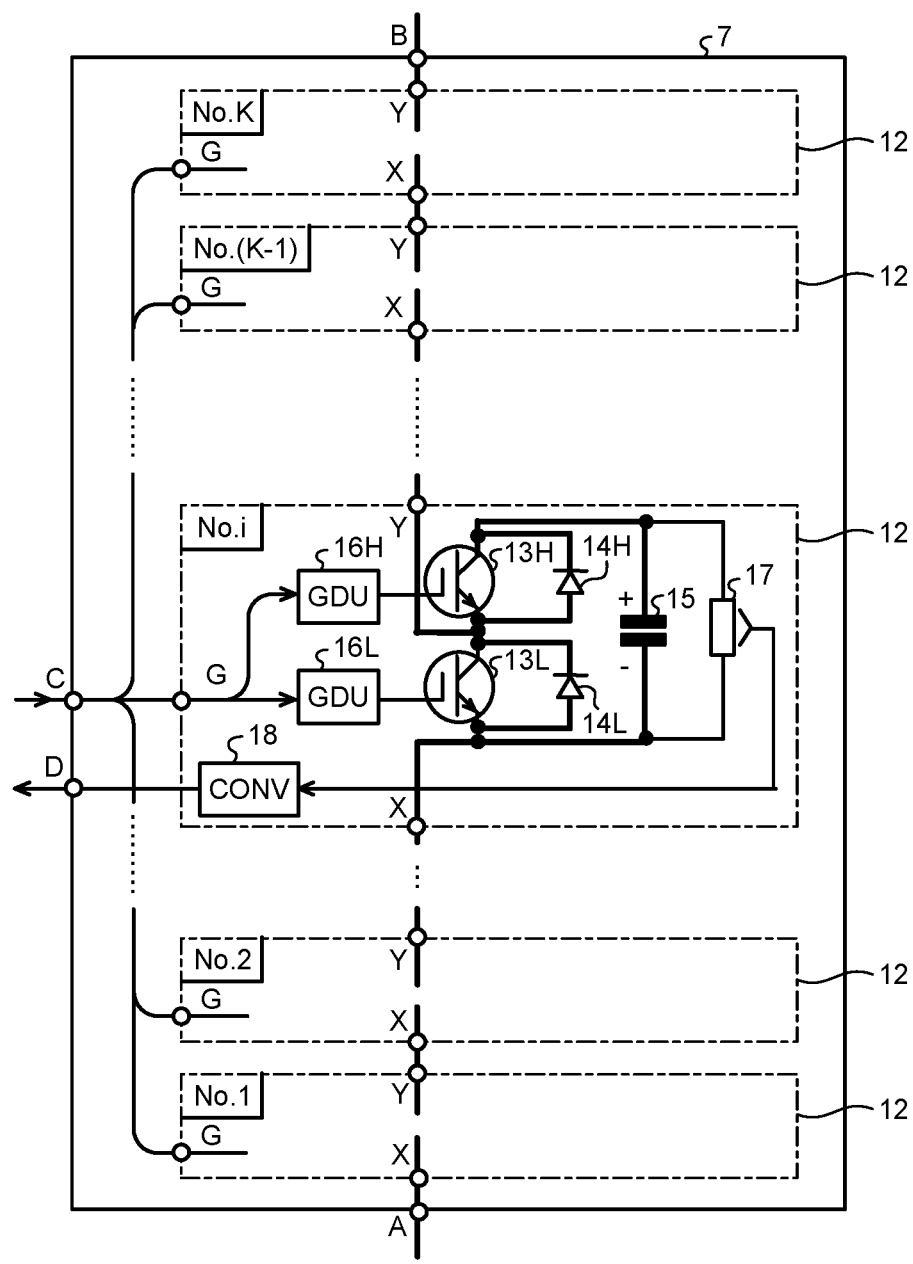
FIG. 2 is a diagram illustrating a circuit configuration of arms (positive-side arms and negative-side arms).

FIG. 2 is a diagram illustrating a circuit configuration of the arms 7 (positive-side arms 7UP, 7VP, or 7WP and negative-side arms 7UN, 7VN, or 7WN).

Each of the arms 7 has a configuration in which K (K is a natural number) half-bridge circuits 12 each included in a unit converter are connected in series between a first terminal A and a second terminal B. In FIG. 2, the description of the circuit configuration is omitted except for the half-bridge circuit 12 of "No. i".

The half-bridge circuit 12 includes two terminals of a positive-side terminal Y and a negative-side terminal X, and self-arc-extinguishing elements 13H and 13L and anti-parallel diodes 14H and 14L included in a bidirectional chopper circuit connected to a capacitor 15.

PWM control is performed based on a command from the converter current control device 11 such that a target voltage is output between the XY terminals by an ignition/extinction command from gate drive units (GDU) 16H and 16L to the self-arc-extinguishing elements 13H and 13L.

Reference numeral 17 denotes a voltage detector that outputs the voltage of the capacitor 15 to a capacitor voltage detector 21 via a signal converter (CONV) 18.

The capacitor voltage detector 21 calculates a total-number (6×K) average value of the capacitor instantaneous voltage values, calculates a value Vc obtained by time-averaging the total-number average value in one cycle of the AC system, and outputs the calculated value to a capacitor voltage adjustment unit (AVcR) 22.

The capacitor voltage adjustment unit (AVcR) 22 calculates an active current command (Iq_ref) such that the capacitor voltage value Vc becomes a set value, and outputs the active current command to the converter current control device 11.

As described above, an AC signal calculation unit 19 receives a voltage/current signal from the signal transformer 5 and calculates and outputs an active power (P_fB), a reactive power (Q_fB), and a positive-phase voltage phase (θp).

As the positive-phase voltage phase (θp), converted values according to the winding configuration of the unit transformer 4 and the phase sequence of the AC system 2 are output to the second terminal side (U, V, and W). In a case where the phase sequence of the AC system 2 is A→B→C, in the example of FIG. 18, the phase is advanced by 30 degrees with respect to the detection phases at the first terminals (AT, BT, and CT) and the values are output.

The AC signal calculation unit 19 further calculates and outputs a positive-phase voltage amplitude (Vp_fB) and a negative-phase voltage amplitude (Vn_fB) of the AC system 2.

Reference numeral 20 denotes a reactive power adjustment unit (AQR) that calculates a reactive current command (Id_ref) such that the reactive power detection value (Q_fB) from the AC signal calculation unit 19 becomes a set value, and outputs the reactive current command (Id_ref) to the converter current control device 11.

As described above, reference numeral 23 denotes a DC power detector that outputs a DC end active power (Pdc_fB) of the MMC converter 1. Reference numeral 24 denotes a switch that selects the DC end active power (Pdc_fB) or an active power (Pac_fB) measured outside via the connection terminal S1, and outputs the selected active power to a DC active power adjustment unit (APdcR) 25.

The DC active power adjustment unit (APdcR) 25 calculates a DC current command (Iz_ref) such that the detection value from the switch 24 becomes a set value (P_ref_mod), and outputs the DC current command (Iz_ref) to the converter current control device 11.

With the above configuration, a power command limiter 26 limits the active power command (P_ref) according to the positive-phase voltage amplitude (Vp_fB) and the negative-phase voltage amplitude (Vn_fB) from the AC signal calculation unit 19, and outputs a correction command (P_ref_mod) to the DC active power adjustment unit (APdcR) 25.

Figure 3:
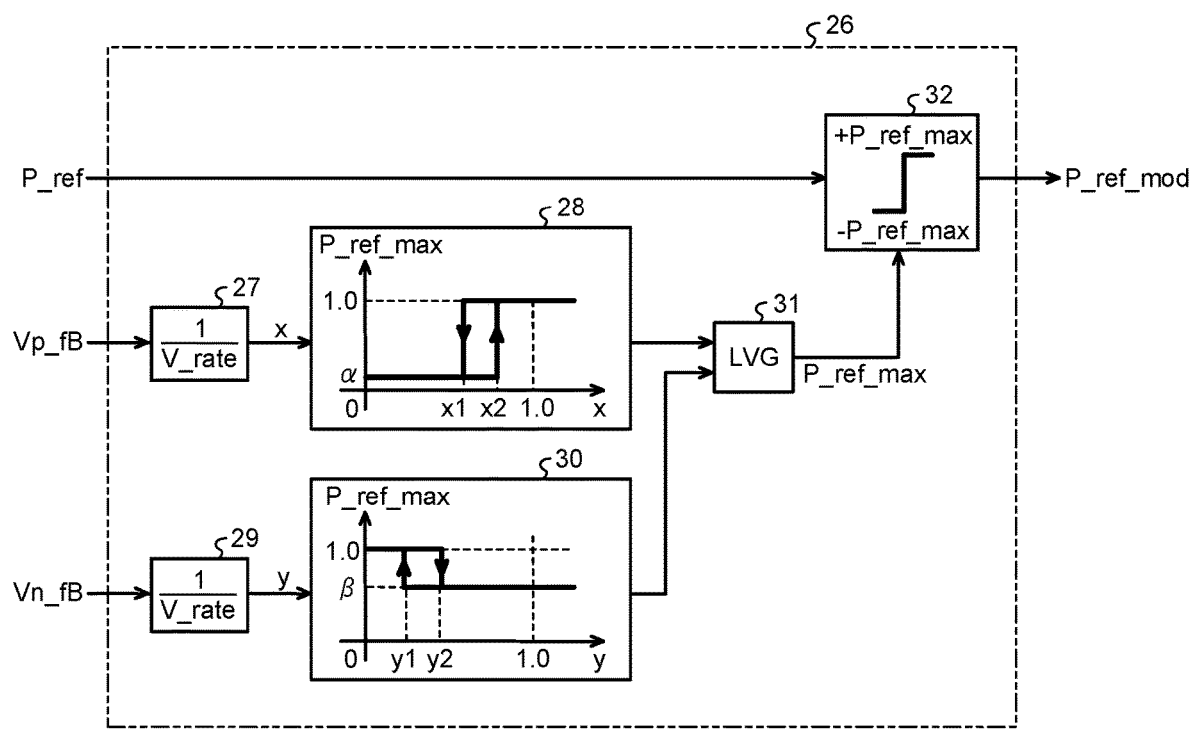
FIG. 3 is a diagram illustrating a configuration of a power command suppression circuit according to the first embodiment.

FIG. 3 is a diagram illustrating an example of the power command limiter 26, in which the positive-phase voltage amplitude (Vp_fB) is unitized by a rated voltage (V_rate) of the AC system 2 at a gain 27 and then is input to a positive-phase limiter 28. Similarly, the negative-phase voltage amplitude (Vn_fB) is unitized at a gain 29 and input to a negative-phase limiter 30.

Reference numeral 31 denotes a low value selection circuit (LVG) that compares the outputs of the positive-phase limiter 28 and the negative-phase limiter 30 to select one of them, outputs a limit value (P_ref_max) to a limiter 32 to suppress the absolute value of the active power command (P_ref) to be equal to or less than the limit value (P_ref_max).

The positive-phase limiter 28 is configured to limit the output to α when the unitized positive-phase voltage amplitude becomes x1 or less, and to set the limit value back to the original value 1.0 when the unitized positive-phase voltage amplitude becomes x2 or more again. This configuration provides an effect of reliably and stably limiting the active power command in the event of a symmetric fault with a simple configuration.

The negative-phase limiter 30 is configured to limit the output to β when the unitized negative-phase voltage amplitude becomes y2 or more, and to set the limit value back to the original value 1.0 when the unitized negative-phase voltage amplitude becomes y1 or less again. This configuration provides an effect of reliably and stably limiting the active power command with a simple configuration, particularly in the event of an asymmetric fault requiring an open-phase operation from removal of the fault phase to reclosing.

Hereinafter, the presence and absence of the power command limiter 26 are compared in the event of fault propagation on the AC system side to describe the effect of the power command limiter 26.

As described above, the behavior in the event of system fault propagation varies depending on whether the system fault mode is a symmetric fault or an asymmetric fault.

Figure 4:
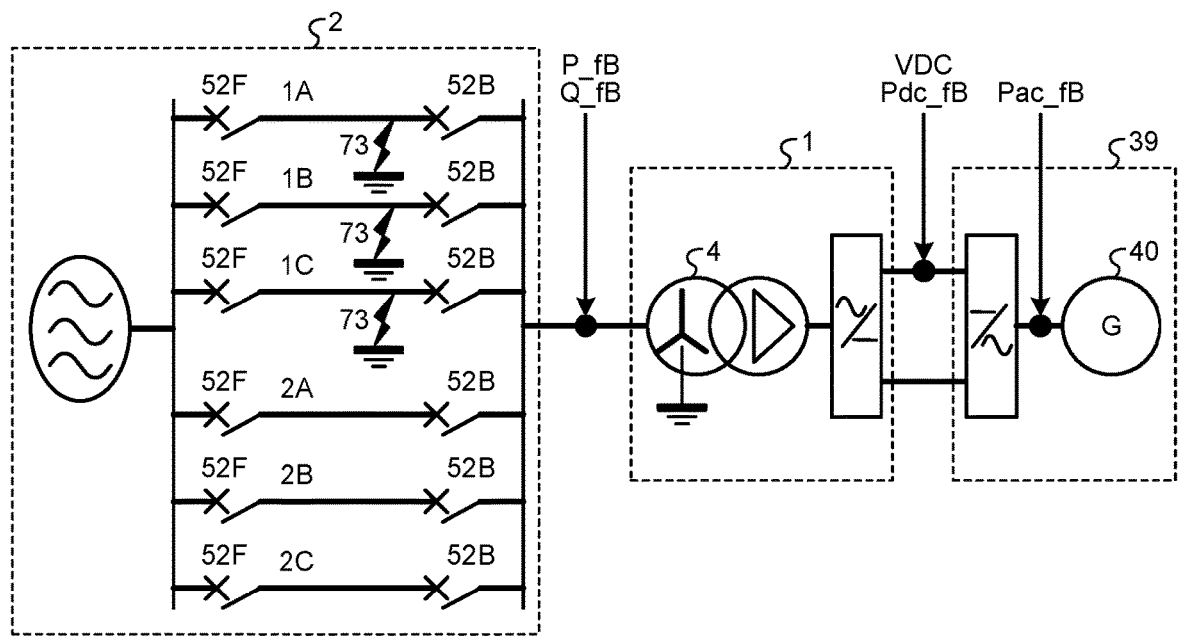
FIG. 4 is an explanatory diagram of a case where a symmetric fault occurs in an AC system in a modular multilevel power conversion system of the present invention during operation.
Figure 4:
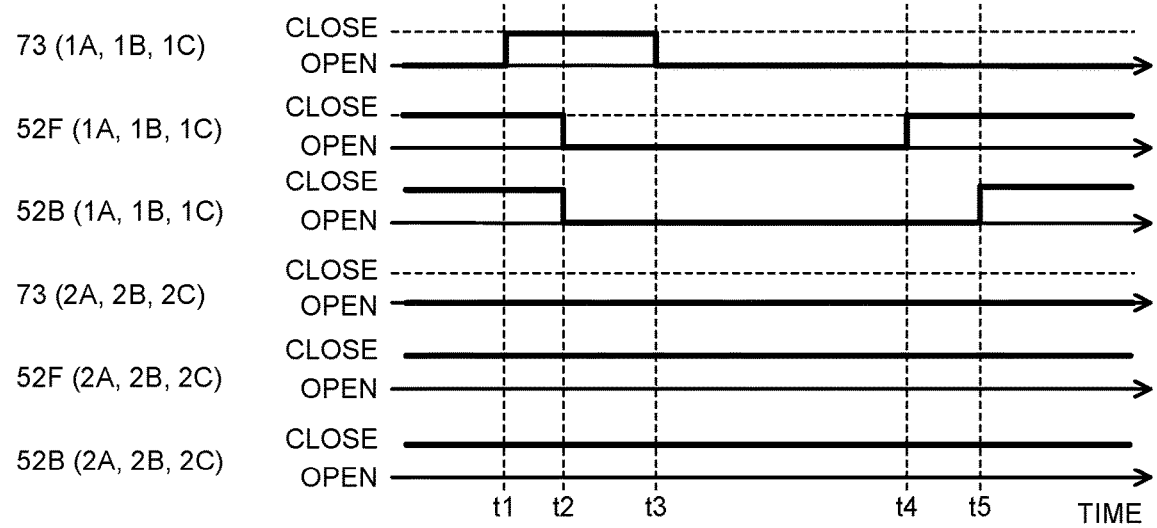

FIG. 4 illustrates an operating condition when the MMC converters are connected to the trailing end of the two-circuit transmission line and a symmetric fault occurs in the AC system 2.

The two-circuit transmission line includes leading end circuit breakers 52F and trailing end circuit breakers 52B. Hereinafter, the three phases of the first line are referred to as (1A, 1B, and 1C), and the three phases of the second line are referred to as (2A, 2B, and 2C).

Here, a case where the DC sides of the two MMC converters are connected back-to-back, one of the MMC converters is connected to the AC system 2 via the unit transformer 4, and the AC side of the other MMC converter is connected to an AC rotary electric machine 40 so that a variable speed generator-motor is formed will be described.

Next, a time chart in the lower part of FIG. 4 will be described. At time t1, a three-phase ground fault occurs in the first line, and the switch 73 are short-circuited. At time t2, the leading end circuit breakers 52F and the trailing end circuit breakers 52B of the first line are operated to open. At time t3, the arc is extinguished and the switch 73 are opened. At time t4, the leading end circuit breakers 52F are reclosed, and at time t5, the trailing end circuit breakers 52B are reclosed.

As described above, the behavior in the event of system fault propagation varies depending on whether the operation is the power generation operation or the electric operation. Hereinafter, referring to FIGS. 5 and 6, behaviors during the power generation operation are compared.

Figure 5:
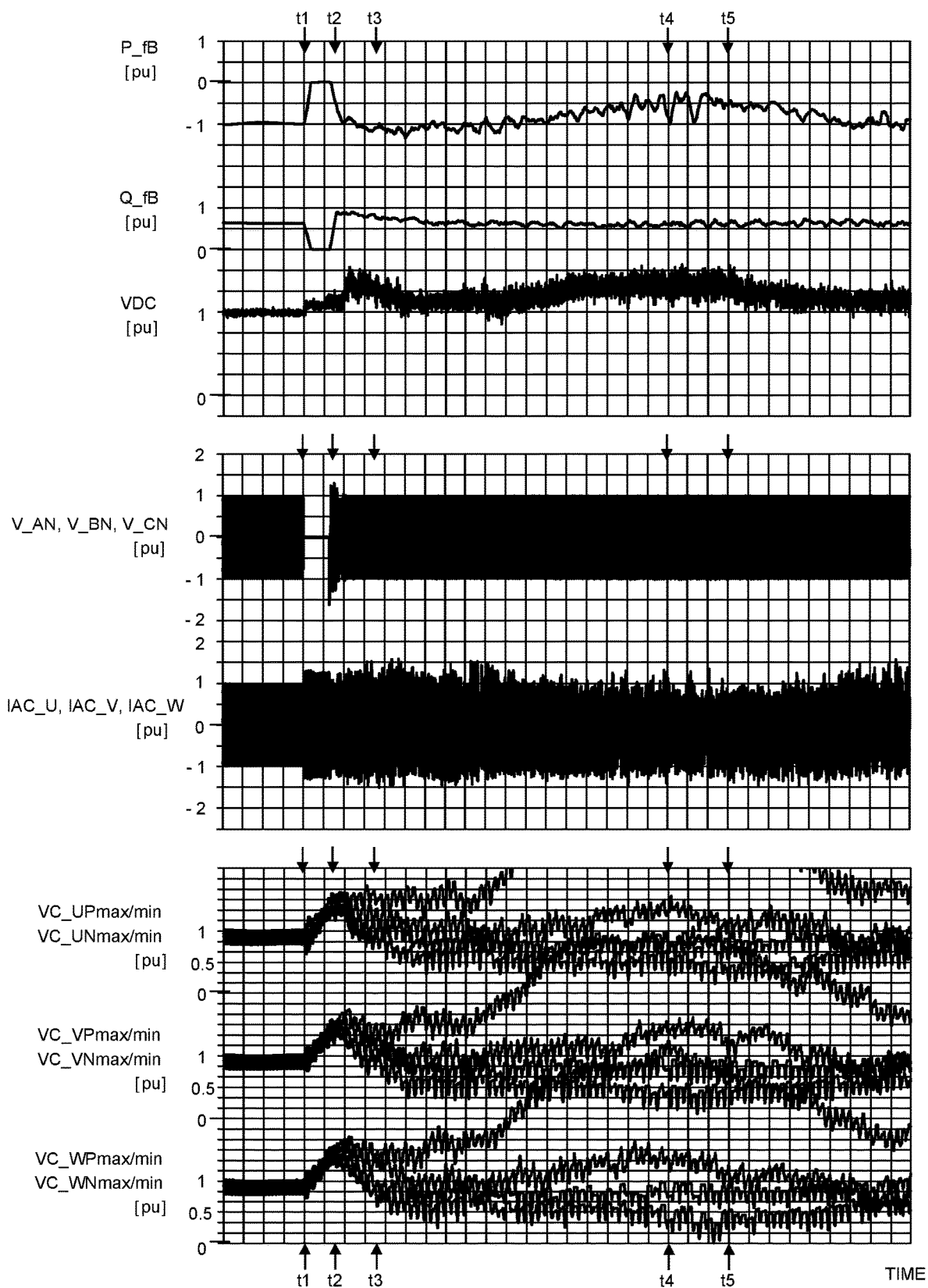
FIG. 5 is a diagram illustrating waveforms at the time of occurrence of a symmetric fault in power generation operation in a case where an average voltage control output of all capacitors is used as an active component command of an AC current, but an active power command suppression circuit by positive-phase voltage detection is not used.

FIG. 5 illustrates the behavior of the configuration illustrated in FIGS. 1 and 2 in a case where the power command limiter 26 in FIG. 3 is not provided in the event of AC system fault propagation described above referring to FIG. 4.

In the upper part of FIG. 5, values obtained by unitizing the active power (P_fB) and the reactive power (Q_fB) illustrated in FIG. 1 by the rated active power output of the MMC converter 1 are illustrated. The active power is illustrated with a positive sign during the electric operation and the reactive power is illustrated with a positive sign when power is supplied to the AC system 2 side. The DC voltage (VDC) is a value obtained by unitizing, by a set value, a voltage value calculated from the differential of the current transformers 9 (9P and 9N), and is a value before passing through the low-pass filter.

In FIG. 5, both the illustrated active power (P_fB) and the illustrated reactive power (Q_fB) are those at the time of rated operation of the MMC converter 1. The rated power factor in this case is 0.85. Since the sign is defined to be positive on the electric operation side, the active power (P_fB) is negative in the initial state of FIG. 5.

The middle part of FIG. 5 illustrates a value obtained by unitizing the phase voltage 3 signal on the first terminal side of the unit transformer 4 measured by the signal transformer 5, by the rated voltage of the unit transformer 4, and a value obtained by unitizing the AC current (IAC_U, IAC_V, and IAC_W) 3 signals on the second terminal side of the unit transformer 4 that are calculated from the detection currents (IP_U, IP_V, IP_W, IN_U, IN_V, and IN_W) of the current transformers 10 and output, by the rated value of the MMC converter 1.

The lower part of FIG. 5 has a three-stage configuration, and the upper part illustrates the instantaneous value of the U-phase capacitor voltage, the middle part illustrates the instantaneous value of the V-phase capacitor voltage, and the lower part illustrates the instantaneous value of the W-phase capacitor voltage of the MMC converter 1. The MMC converter is an example in which 12 unit converters included in an arm are connected in series (K=12).

Hereinafter, the U phase will be described. For the U phase, there are 12 capacitors on the positive side and 12 capacitors on the negative side, but they are summarized to 4 signals to avoid complexity. Here, instead of the K capacitor voltage signals of each of the positive-side arms (UP, VP, and WP), two signals: the maximum value (Vc_UPmax) and the minimum value (Vc_UPmin) of the 12 capacitors are described as summarization. Similarly, the maximum value (Vc_UNmax) and the minimum value (Vc_UNmin) of the K capacitor voltages of each of the negative-side arms (UN, VN, and WN) are described as representative. The above-described four signals are unitized by the rated voltage V0 of the capacitors and superimposed and illustrated on the same vertical axis coordinate.

Similarly, each of the V phase and the W phase is represented by four signals, but description thereof is omitted to avoid duplication.

In the waveforms illustrated in FIG. 5, the waveforms are also illustrated after time t5. This is a numerical analysis result. The continuous operation of an MMC converter is not possible when the MMC converter is with economic rationality for the following reasons.

The maximum bottleneck is the capacitor voltages illustrated in the lower part of FIG. 5. The rated voltage V0 of the capacitor voltage means a repetitive permissible voltage. In addition, a non-repetitive permissible voltage is defined as a capacitor voltage rated value.

In order to simultaneously ensure safety and economic rationality consistency in the known art at the present time, it is necessary to suppress the maximum voltage value to twice V0 or less when used in an MMC converter. Before that, in order to protect the self-arc-extinguishing elements 13H and 13L and the anti-parallel diodes 14H and 14L, it is necessary to suppress the non-repetitive capacitor voltage to approximately 1.5 times V0 or less.

In light of the above-described capacitor permissible voltage, before time t2 when the leading end circuit breaker 52F and the trailing end circuit breaker 52B operate, the capacitor voltage exceeds the permissible value, and the MMC converter 1 needs to be stopped for protection. The rapid rise of the capacitor voltage is caused by the reduction of the capacitor capacity in order to downsize the MMC converter 1.

Figure 17:
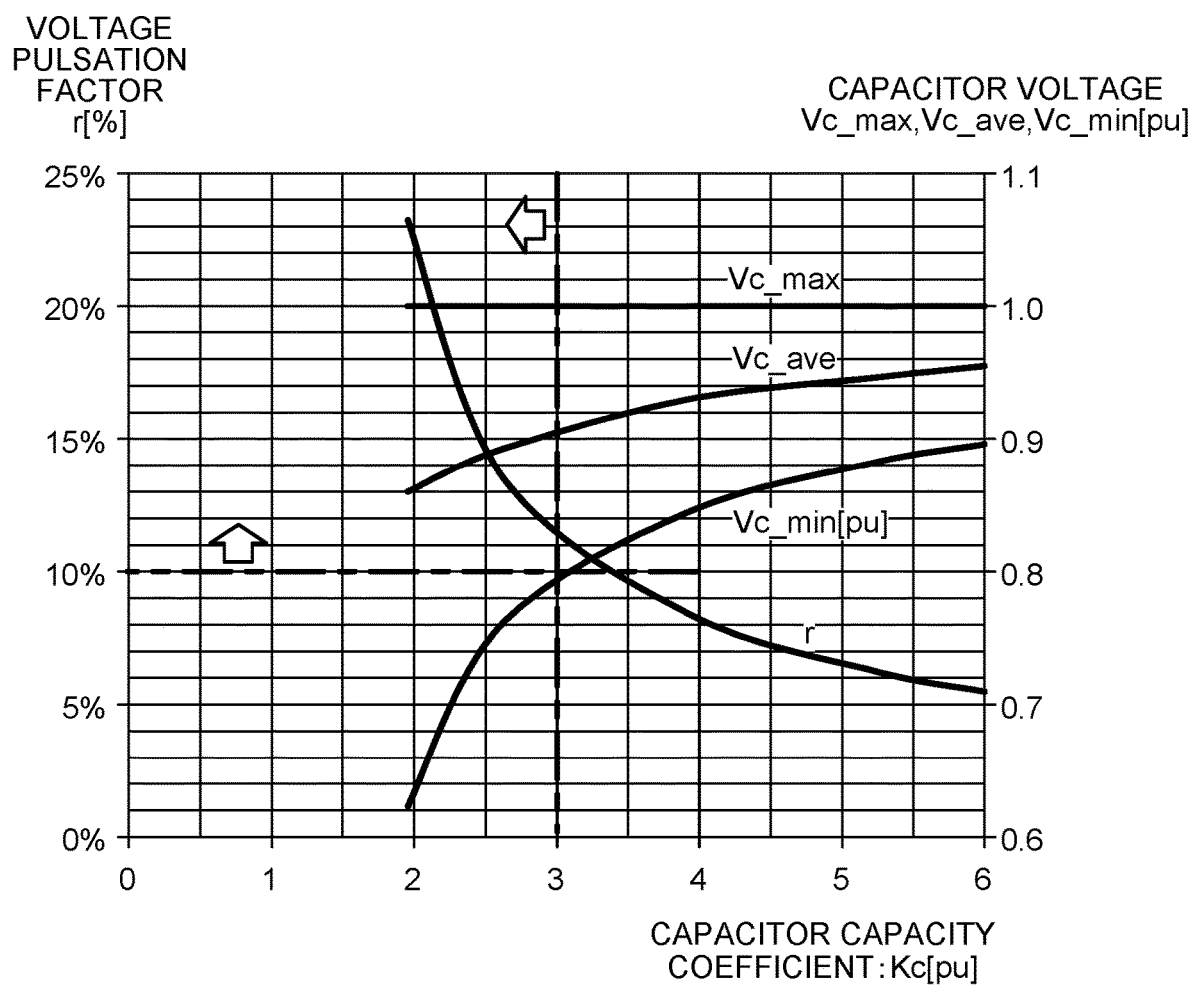
FIG. 17 is a diagram illustrating a relationship between the capacity of a capacitor included in a unit converter of the MMC converter, and the voltage pulsation factor, the maximum voltage value, the average voltage value, and the minimum voltage value of the capacitor.

For example, when the capacitor capacity is doubled as illustrated in FIG. 17 described above in order to suppress the voltage pulsation factor at the time of rated output from 5 to 8%, the maximum value of the capacitor voltage does not exceed 1.5 times V0 even under the completely same condition as FIG. 5.

Figure 6:
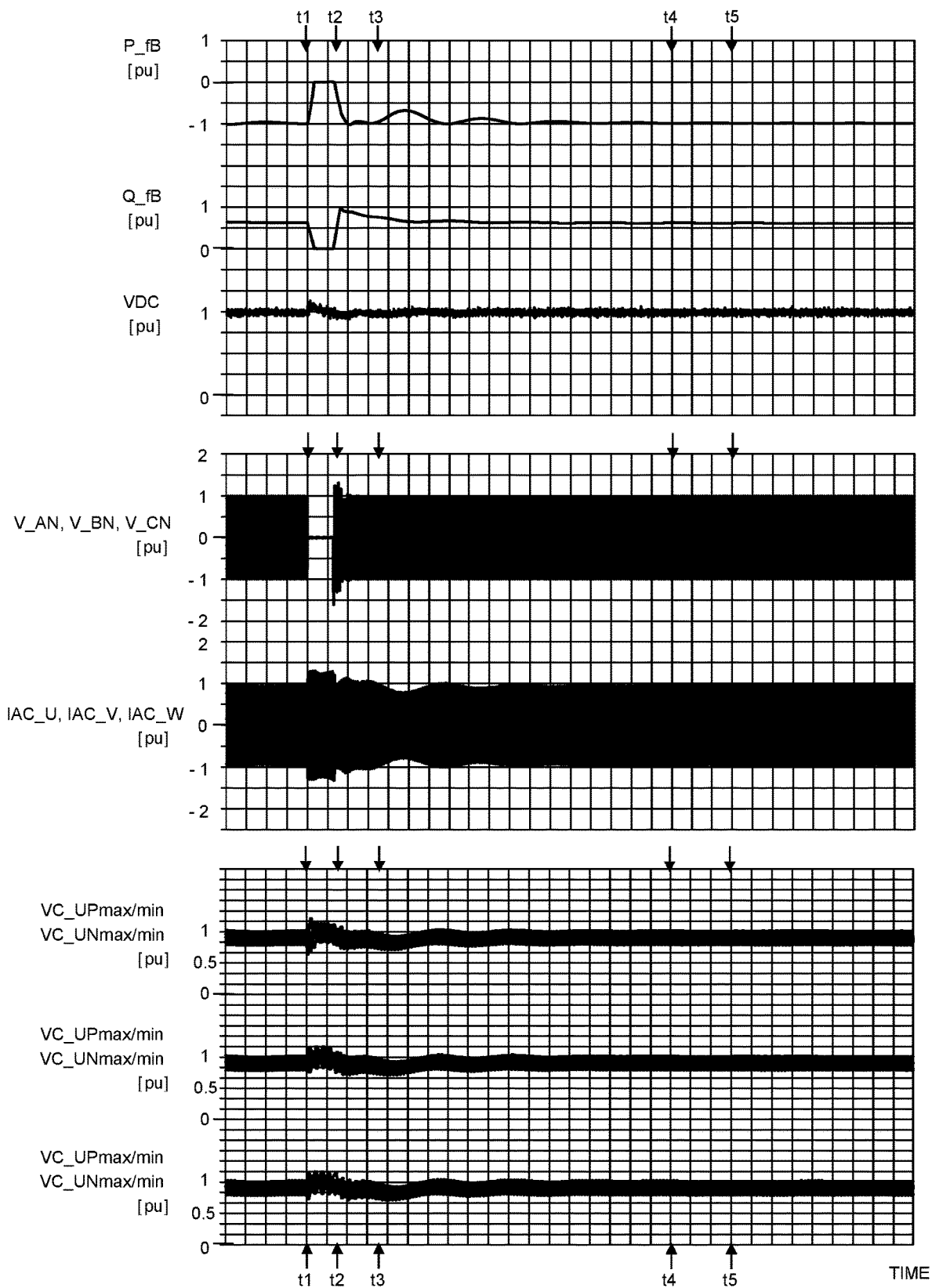
FIG. 6 is a diagram illustrating waveforms at the time of occurrence of a symmetric fault in power generation operation in a case where an average voltage control output of all capacitors is used as an active component command of an AC current and an active power command suppression circuit by positive-phase voltage detection is used.

FIG. 6 illustrates the behavior of the configuration illustrated in FIGS. 1 and 2 similarly to FIG. 5 in the event of AC system fault propagation described above referring to FIG. 4, but in a case where the power command limiter 26 in FIG. 3 is used.

In FIG. 6, the positive-phase limiter 28 in FIG. 3 is set as (x1=0.8, x2=0.95, and α=0), and the negative-phase limiter 30 is set as (y1=0.1, y2=0.2, and R=0.6). It is known that a set value of a suitable for the MMC converter in which the capacitor voltage pulsation factor r is 10% or more is 0 to 0.2 or less.

The waveforms illustrated in the upper, middle, and lower parts of FIG. 6 and the way of indication are the same as those in FIG. 5, and the description thereof will be omitted to avoid duplication.

The capacitor voltages illustrated in the lower part of FIG. 6 are 1.5 times or less (about 1.2 times) that is the above-described permissible voltage without a phenomenon that the maximum values and the minimum values of the capacitor voltages are separated. That is, the capacitor voltages are balanced.

Thus, it can be seen that the MMC converter 1 can stably continue the operation after time t5 by the power command limiter 26.

In the event of a symmetric fault illustrated in FIG. 4, the negative-phase limiter 30 does not operate. In a case the 24 C converter 1 is directly connected to the loop power transmission system where it is not required to continue the operation during the open-phase operation because the importance in power system operation is not strict, there is an effect of omitting the negative-phase voltage detection and the negative-phase limiter 30 for simplification.

As described above, the behavior in the event of system fault propagation varies depending on whether the system fault mode is a symmetric fault or an asymmetric fault.

Figure 7:
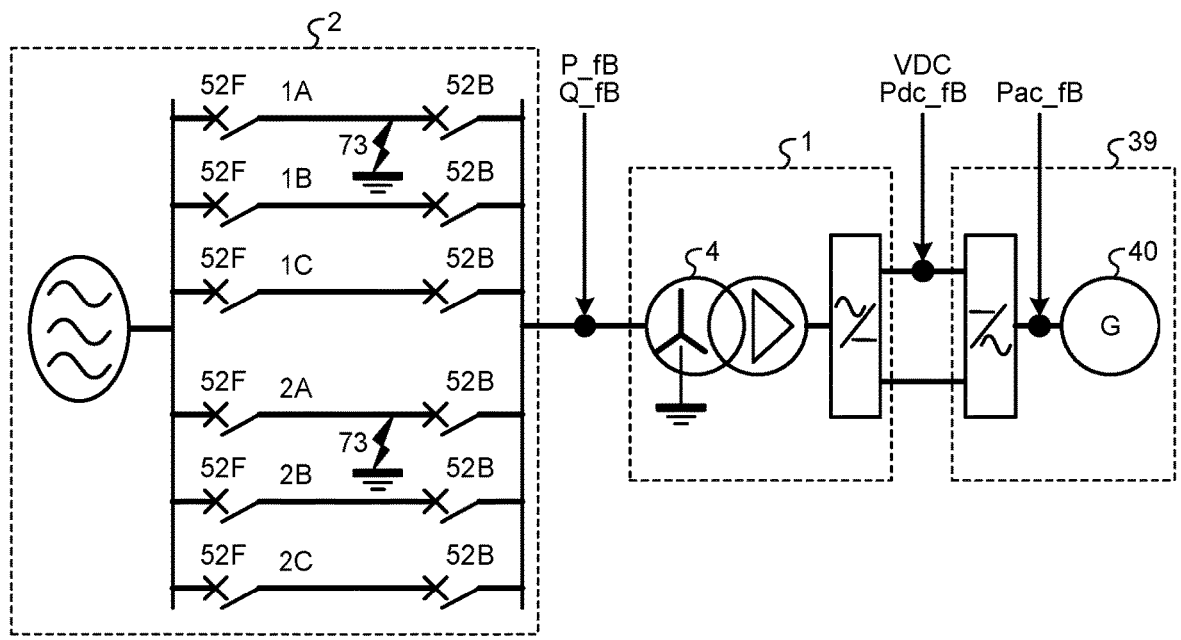
FIG. 7 is an explanatory diagram of a case where an asymmetric fault occurs in an AC system in a modular multilevel power conversion system of the present invention during operation.
Figure 7:
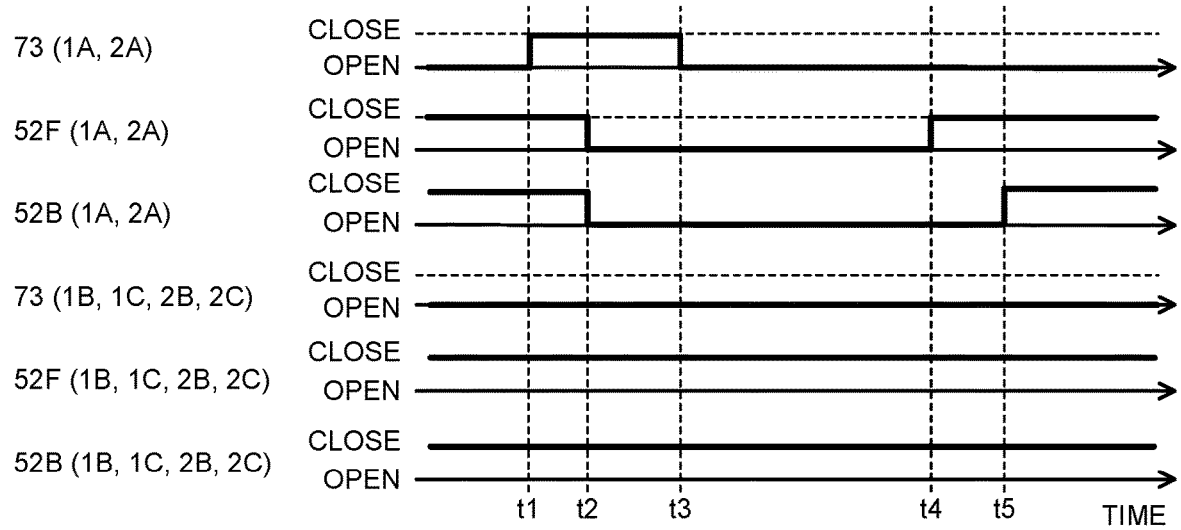

FIG. 7 illustrates an operating condition when the MMC converters are connected to the trailing end of the two-circuit transmission line and an asymmetric fault involving open-phase operation occurs in the AC system 2.

The configuration in FIG. 7 is the same as that in FIG. 4 in that a two-circuit transmission line configuration is included, and that the DC sides of the two MMC converters are connected back-to-back, one of the MMC converter is connected to the AC system 2 via the unit transformer 4, and the AC side of the other MMC converter is connected to an AC rotary electric machine 40 to be described below so that a variable speed generator-motor is formed.

Next, a time chart in the lower part of FIG. 7 will be described. At time t1, a ground fault occurs simultaneously in the 1A phase of the first line and the 2A phase of the second line, and the switch 73 are short-circuited. At time t2, the leading end circuit breakers 52F and the trailing end circuit breakers 52B of the first line are operated to open. At time t3, the arc is extinguished and the switch 73 are opened. At time t4, the leading end circuit breakers 52F are reclosed, and at time t5, the trailing end circuit breakers 52B are reclosed. During a period from time t2 to time t5, the MMC converter 1 is in a two-phase energized state of the B phase and the C phase (A-phase open state).

As described above, the behavior in the event of system fault propagation varies depending on whether the operation is the power generation operation or the electric operation. Hereinafter, referring to FIGS. 8 and 9, behaviors during the pumping operation are compared.

Figure 8:
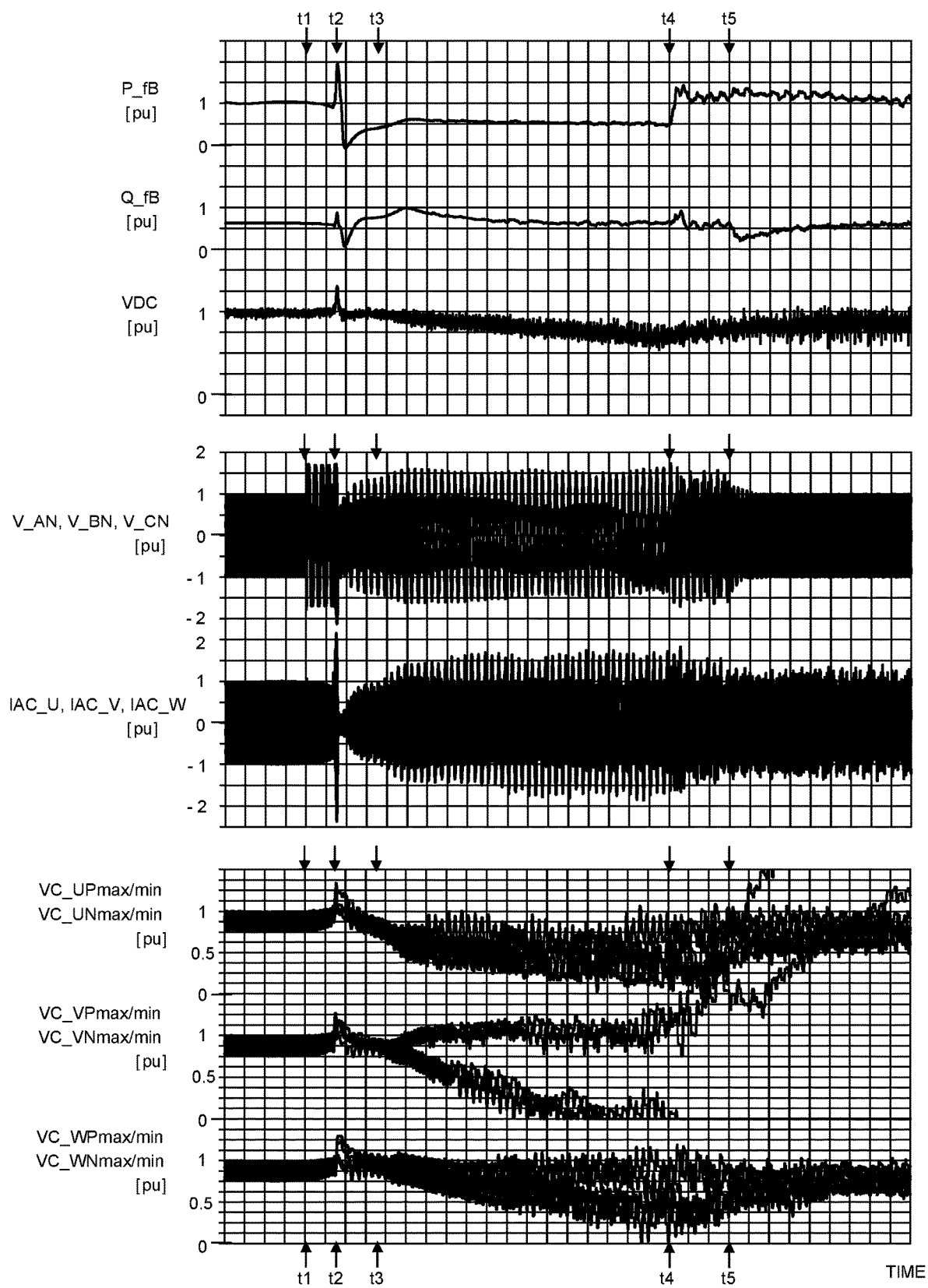
FIG. 8 is a diagram illustrating waveforms at the time of occurrence of an asymmetric fault in electric operation in a case where an average voltage control output of all capacitors is used as an active component command of an AC current, only positive-phase voltage detection is used in an active power command suppression circuit, and an active power command suppression circuit by negative-phase voltage detection is not used.

FIG. 8 illustrates the behavior of the configuration illustrated in FIGS. 1 and 2 in the event of AC system fault propagation described above referring to FIG. 7 in a case where in the power command limiter 26 in FIG. 3, the positive-phase limiter 28 is set as (x1=0.8, x2=0.95, and α=0) similarly to FIG. 6, but the negative-phase limiter 30 is intentionally set as (y1=1.1 and y2=1.2) so that the negative-phase limiter 30 is not operated.

In FIG. 8, both the illustrated active power (P_fB) and the illustrated reactive power (Q_fB) are those at the time of rated operation of the MMC converter 1. The rated power factor of this example is 0.85.

The waveforms illustrated in the upper, middle, and lower parts of FIG. 8 and the way of indication are the same as those in FIG. 6, and the description thereof will be omitted to avoid duplication. The way of indication of the active power (P_fB) is the same as FIG. 6 including the sign. Since FIG. 8 illustrates the case of electric operation, the active power (P_fB) has a positive sign.

From the voltage waveforms of the capacitors illustrated in the lower part of FIG. 8, it can be seen that the voltage balance starts to be disturbed after time t3, and the difference between the maximum value and the minimum value are larger in the order of the V phase, the W phase, and the U phase. In the case of the V phase, the minimum value is 0 for both the P-side arm and the N-side arm, that is, the stored energy has been completely released. On the other hand, the maximum values exceed twice that is a guide of the maximum permissible value of the capacitors.

Figure 9:
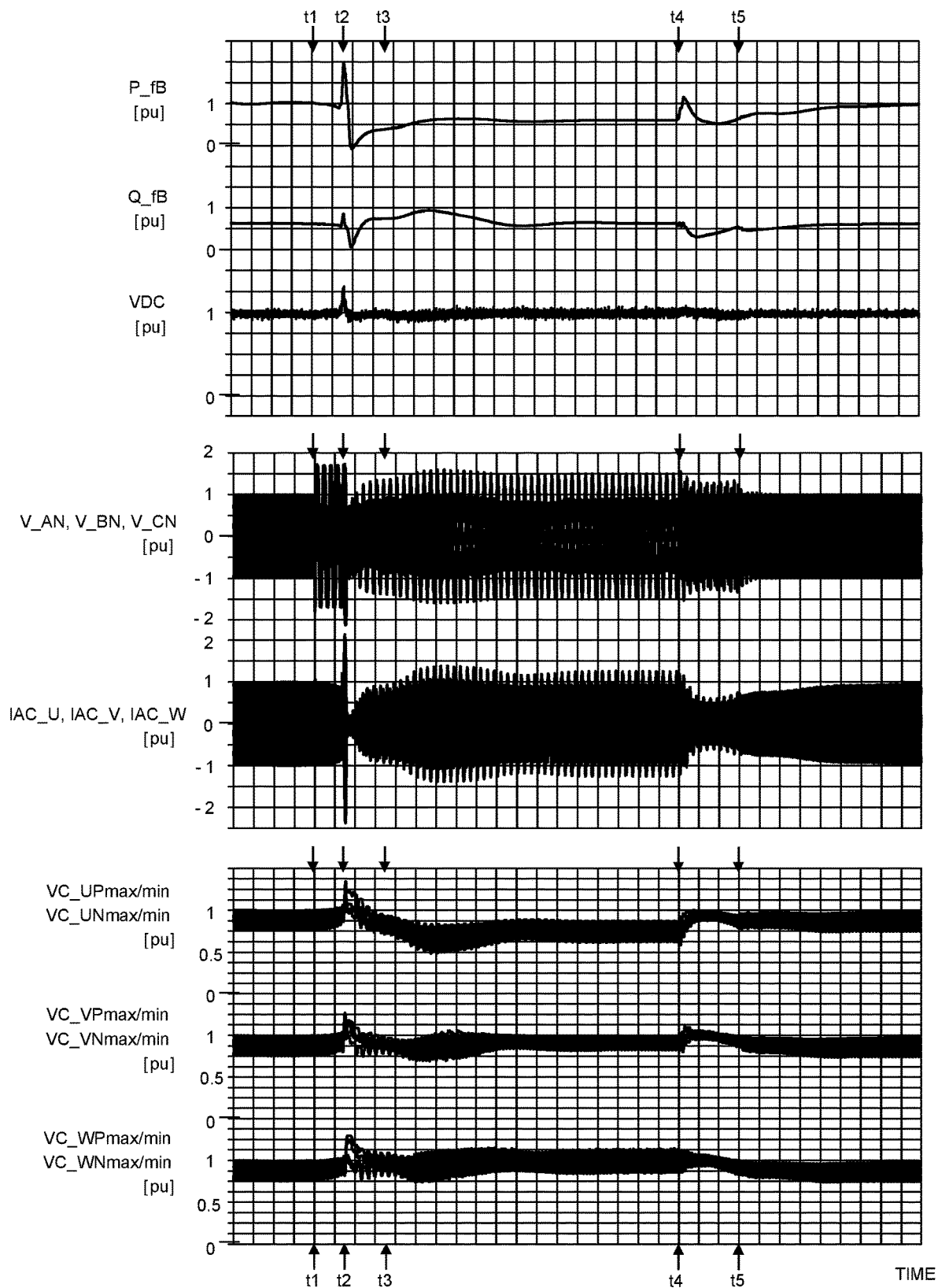
FIG. 9 is a diagram illustrating waveforms at the time of occurrence of an asymmetric fault in electric operation in a case where an average voltage control output of all capacitors is used as an active component command of an AC current, and an active power command suppression circuit by both positive-phase voltage detection and negative-phase voltage detection is used.

FIG. 9 illustrates the behavior of the configuration of FIGS. 1 and 2 that is the same as in FIG. 8, and in the power command limiter 26 in FIG. 3, the positive-phase limiter 28 is also set as (x1=0.8, x2=0.95, and α=0) as in FIG. 8. The only difference is the setting of the negative-phase limiter 30, which is set as (y1=0.1, y2=0.2, and R=0.6) as in FIG. 6 described above. It is known that a set value of β suitable for the MMC converter in which the capacitor voltage pulsation factor r is 10% or more is 0.3 or more and 0.7 or less. In the above-described case, the behavior in the event of AC system fault propagation described above referring to FIG. 7 is provided.

The waveforms illustrated in the upper, middle, and lower parts of FIG. 9 and the way of indication are the same as those in FIG. 8, and the description thereof will be omitted to avoid duplication.

The capacitor voltages illustrated in the lower part of FIG. 9 are 1.5 times or less (about 1.35 times) that is the above-described permissible voltage without a phenomenon that the maximum values and the minimum values of the capacitor voltages are separated. That is, the capacitor voltages are balanced.

Thus, it can be seen that the MMC converter 1 can stably continue the operation even after the open-phase operation from time t2 to time t5 by the effect of the negative-phase limiter 30 included in the power command limiter 26.

Figure 10:
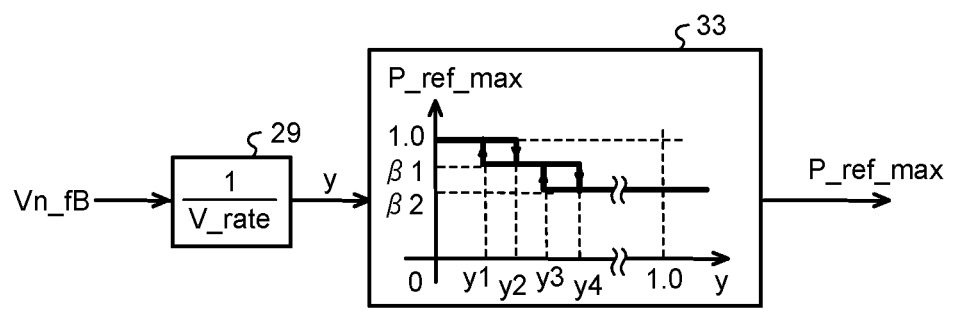
FIG. 10 is a diagram illustrating another configuration of a power command suppression circuit according to the first embodiment.

FIG. 10 illustrates another example of the negative-phase limiter 30 included in the power command limiter 26.

The negative-phase limiter 33, which is another example of the negative-phase limiter 30, limits the output to β1 when the unitized negative-phase voltage amplitude becomes y2 or more, and limits the output to P2 when the unitized negative-phase voltage amplitude becomes y4 or more. When the unitized negative-phase voltage amplitude becomes y3 or less again, the negative-phase limiter 33 sets the limit value back to R1, and when the unitized negative-phase voltage amplitude becomes to y1 or less again, the negative-phase limiter 33 sets the limit value back to the original value 1.

The configuration of FIG. 10 enables adjustment of the limit value of the power command in three stages according to the negative-phase voltage generation level, enabling suppression of a decrease in active power. In particular, when the MMC converter 1 is applied to an AC generator-motor, there is an effect of suppressing a speed decrease caused by a decrease in active power during electric operation. In particular, when the MMC converter 1 is applied to a variable speed pumped-storage power generation system that drives a pump turbine, there is an effect of reducing the risk of falling into a backflow region of the pump turbine due to stall during an open-phase operation period.

Second Embodiment

Figure 11:
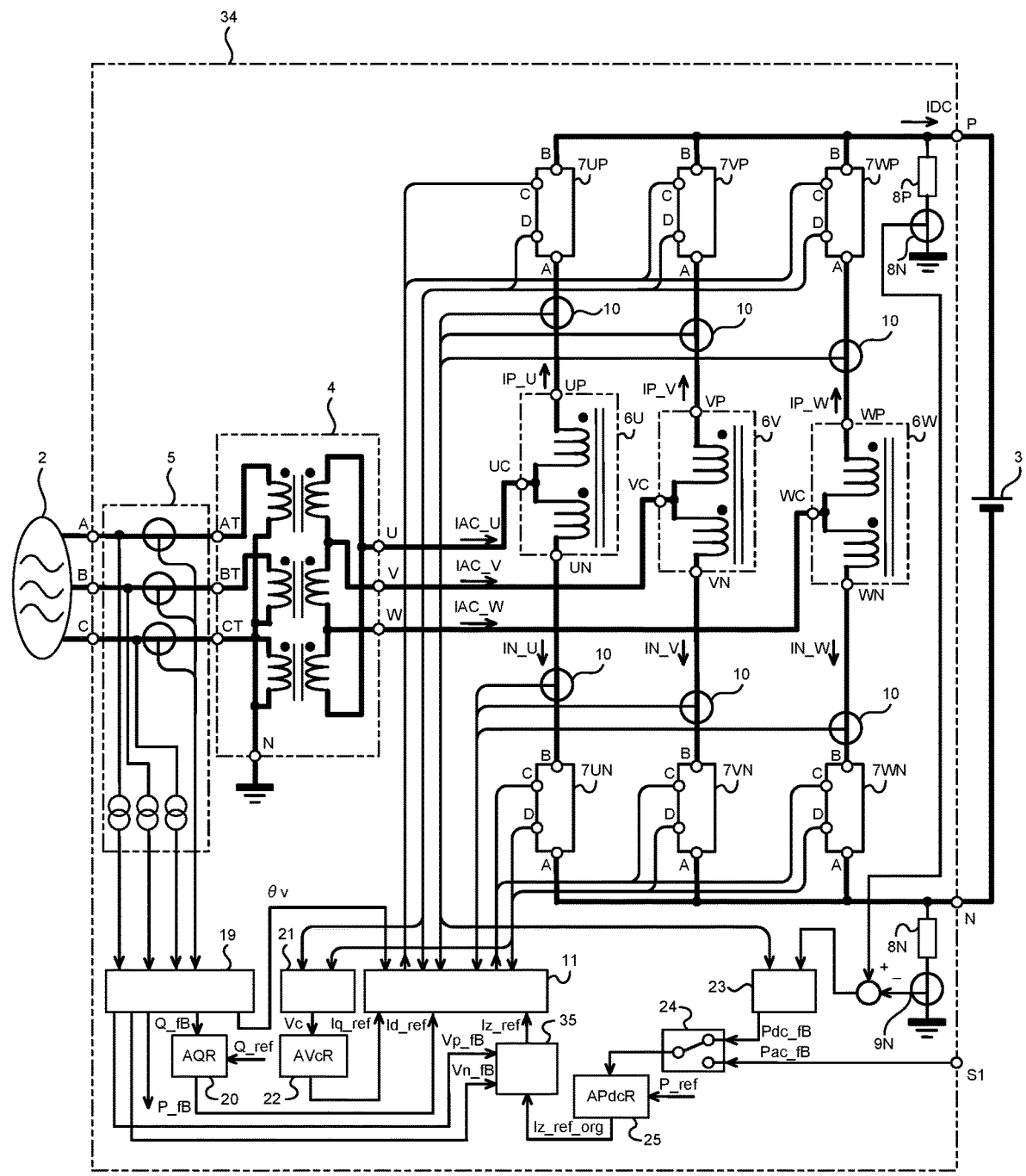
FIG. 11 is a diagram illustrating a circuit configuration of a second embodiment of an MMC converter according to the present invention.

FIG. 11 is a diagram illustrating a circuit configuration of a second embodiment of an MMC converter according to the present invention. In FIG. 11, the same components as those of the MMC converter 1 according to the first embodiment illustrated in FIG. 1 are denoted by the same reference numerals. The same components as those of the MMC converter 1 will not be described in order to avoid duplication.

Reference numeral 34 denotes an MMC converter, and reference numeral 35 denotes a current command limiter.

Figure 12:
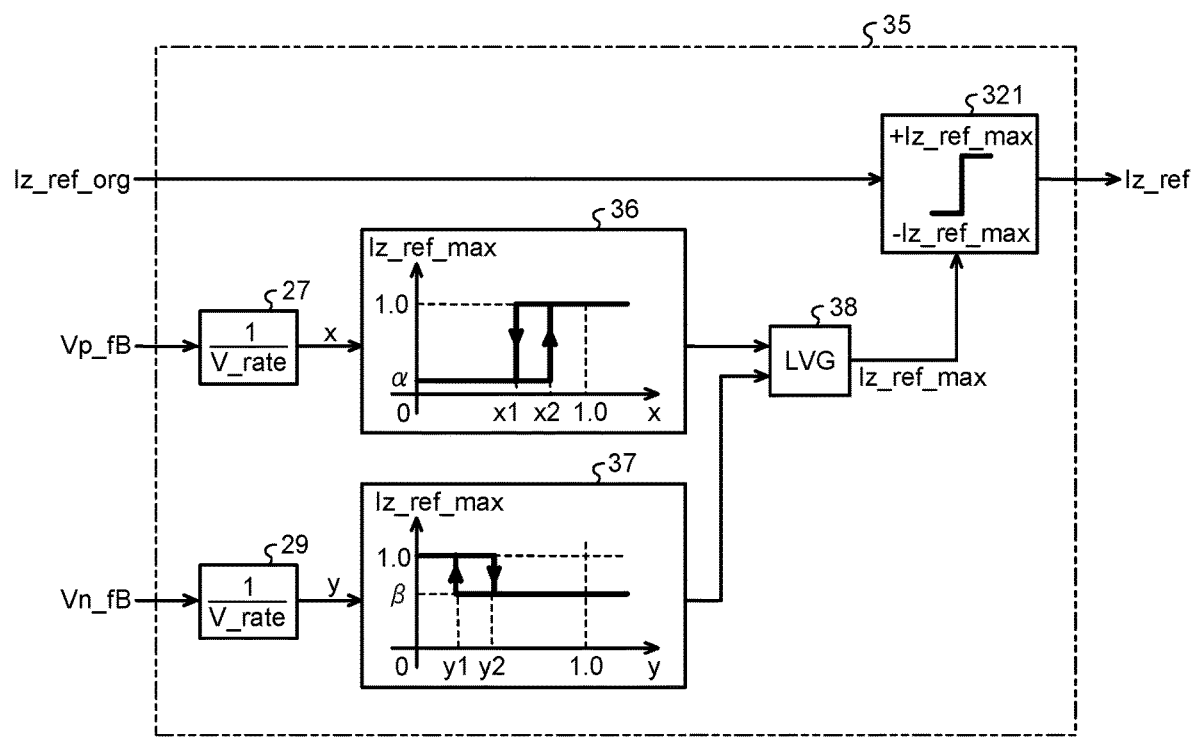
FIG. 12 is a diagram illustrating a configuration of a current command suppression circuit according to the second embodiment.

FIG. 12 is a diagram illustrating an embodiment of the current command limiter 35, in which the positive-phase voltage amplitude (Vp_fB) is unitized by a rated voltage (V_rate) of the AC system 2 at a gain 27 and then is input to a positive-phase limiter 36. Similarly, the negative-phase voltage amplitude (Vn_fB) is unitized at a gain 29 and input to a negative-phase limiter 37.

Reference numeral 38 denotes a low value selection circuit (LVG) that compares the outputs of the positive-phase limiter 36 and the negative-phase limiter 37 to select one of them, outputs a limit value (Iz_ref_max) to a limiter 321 to suppress the absolute value of the DC current command (Iz_ref_org) to be equal to or less than the limit value (Iz_ref_max).

According to the embodiments of FIGS. 11 and 12, the DC current command (Iz_ref_org) to the converter current control device 11 is directly limited, there is an effect of rapidly controlling an MMC converter 39 after detecting changes in the positive-phase voltage amplitude (Vp_fB) and the negative-phase voltage amplitude (Vn_fB) in the event of system fault propagation.

Third Embodiment

Figure 13:
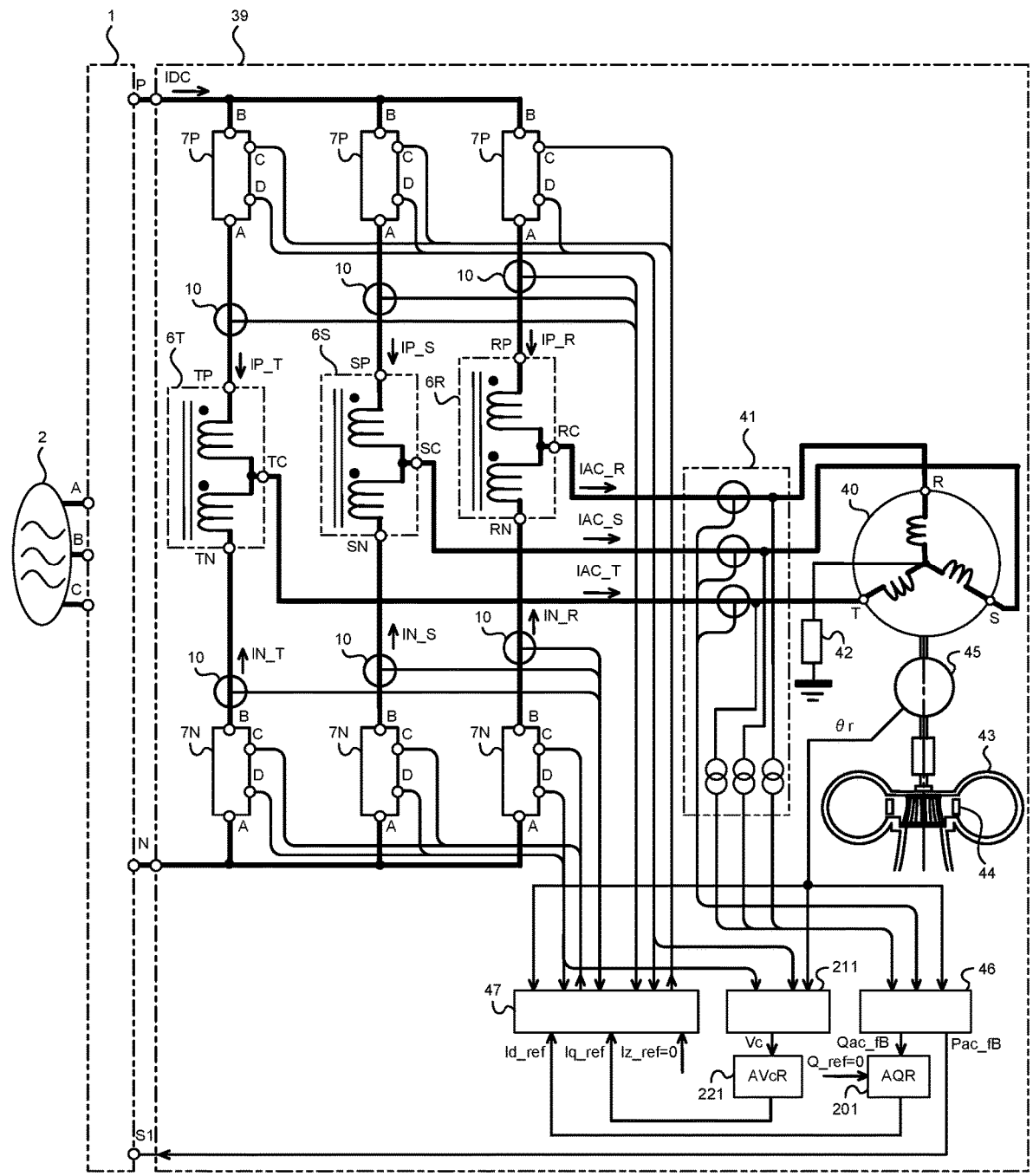
FIG. 13 is a diagram illustrating a circuit configuration of a third embodiment of a variable speed generator-motor according to the present invention.

FIG. 13 is a diagram illustrating a circuit configuration of a third embodiment relating to a variable speed generator-motor using the MMC converter 1 and the MMC converter 39 according to the present invention. In FIG. 13, the same components as those of the MMC converter 1 according to the first embodiment illustrated in FIG. 1 are denoted by the same reference numerals. The same components as those of the MMC converter 1 will not be described in order to avoid duplication.

Reference numeral 39 denotes an MMC converter that is connected, as a DC power supply, to the MMC converter 1 by back-to-back connection of the DC sides of the DC positive-side terminals (P) and the negative-side terminals (N), and a three-terminal reactor 6R, 6S, and 6T is provided between AC terminals (R, S, and T) of the respective phases of the AC rotary electric machine 40, the first terminals of the positive-side arms 7P, and the second terminals of the negative-side arms 7N.

Reference numeral 10 denotes a current transformer that detects currents (IP_R, IP_S, IP_T, IN_R, IN_S, and IN_T) of six coils included in the three-terminal reactor 6R, 6S, and 6T, and outputs the currents to an AC signal calculation unit 46.

Reference numeral 41 denotes a signal transformer that includes three voltage transformers and three current transformers. The armature neutral point of the AC rotary electric machine 40 is grounded via a high resistor 42.

In the embodiment of FIG. 13, a pump turbine 43 is directly connected to the rotation shaft of the AC rotary electric machine 40. The pump turbine 43 has an opening/closing control function of guide vanes 44. By making the AC output of the MMC converter 39 be a variable frequency, the variable speed operation of the pump turbine 43 is achieved.

Reference numeral 45 denotes a rotation phase detector that outputs a phase Or of the rotation shaft of the AC rotary electric machine 40 expressed as an electrical angle.

Reference numeral 46 denotes an AC signal calculation unit that receives a voltage/current signal from the signal transformer 41 and the rotation phase Or, and calculates a so-called instantaneous active power (Pac_syn) and a reactive power (Qac_syn) at regular time intervals according to the following Mathematical formula (3). In the mathematical formula, the phase voltages from the signal transformer 41 are indicated as (V_R, V_S, and V_T), and the currents are indicated as (I_R, I_S, and I_T). Here, the phase sequence of the AC rotary electric machine 40 is R→S→T.

Mathematical formula 3

$$Pac\_syn = V\_R \times I\_R + V\_S \times I\_S + V\_T \times I\_T \quad (3)$$

-continued $$Qac\_syn = \frac{1}{\sqrt{3}}\{V\_R \times (I\_S - I\_T) + V\_S \times (I\_T - I\_R) + V\_T \times (I\_R - I\_S)\}$$

Further, the AC signal calculation unit 46 takes the moving average of the instantaneous active power (Pac_syn) and the reactive power (Qac_syn) in one cycle of the rotation phase (Or) from the rotation phase detector 45 and outputs the active power (Pac_fB) and the reactive power (Qac_fB) of the AC rotary electric machine 40.

In the embodiment of FIG. 13, the active power (Pac_fB) signal is output to the above-described DC active power adjustment unit (APdcR) 25 via an external terminal (S1) of the MMC converter 1 and via the switch 24.

Reference numeral 211 denotes a capacitor voltage detector that calculates a total-number (6×K) average value of the capacitor instantaneous voltage values, calculates a value Vc obtained by time-averaging total-number average value in one cycle of the rotation phase (Or), and outputs the calculated value to a capacitor voltage adjustment unit (AVcR) 221.

Reference numeral 201 denotes a reactive power adjustment unit (AQR) that realizes a power factor 1 operation to minimize the current value of the AC rotary electric machine 40. The reactive power adjustment unit (AQR) 201 calculates a reactive current command (Id_ref) such that the reactive power detection value (Qac_fB) from the AC signal calculation unit 46 becomes a set value (Qref=0), and outputs the reactive current command (Id_ref) to a converter current control device 47.

The capacitor voltage adjustment unit (AVcR) 221 calculates an active current command (Iq_ref) such that the capacitor voltage value Vc becomes a set value, and outputs the active current command to the converter current control device 47.

The DC current command is fixed to (Iz_ref=0) and output to the converter current control device 47.

The converter current control device 47 receives detection currents (IP_R, IP_S, IP_T, IN_R, IN_S, and IN_T) of the current transformers 10, and calculates AC currents (IAC_R, IAC_S, and IAC_T) and through currents (IPN_R, IPN_S, and IPN_T) flowing from the negative-side arms 7N to the positive-side arms 7P of the respective phases.

The relationship between the current command values (Id_ref and Iq_ref), the AC current commands (IAC_R_ref, IAC_S_ref, and IAC_T_ref) and the rotation phase (Or) is expressed by Mathematical formula (4).

Mathematical formula 4

$$\begin{bmatrix} IAC\_R\_ref \\ IAC\_S\_ref \\ IAC\_T\_ref \end{bmatrix} = \begin{bmatrix} \cos(\theta r) & \sin(\theta r) \\ \cos\left(\theta r - \frac{2}{3}\pi\right) & \sin\left(\theta r - \frac{2}{3}\pi\right) \\ \cos\left(\theta r + \frac{2}{3}\pi\right) & \sin\left(\theta r + \frac{2}{3}\pi\right) \end{bmatrix} \begin{bmatrix} Iq\_ref \\ Id\_ref \end{bmatrix} \quad (4)$$

In addition, the relationship between the current commands (IP_R_ref, IP_S_ref, and IP_T_ref) of the positive-side arms, the current commands (IN_R_ref, IN_S_ref, and IN_T_ref) of the negative-side arms, the AC current commands (IAC_R_ref, IAC_S_ref, and IAC_T_ref), and the DC current command (Iz_ref) is expressed by the following mathematical formulas.

$$IP\_R\_ref = (\tfrac{1}{2}) \times IAC\_R\_ref + Iz\_ref$$

$$IP\_S\_ref = (\tfrac{1}{2}) \times IAC\_S\_ref + Iz\_ref$$

$$IP\_T\_ref=(\tfrac{1}{2})\times IAC\_T\_ref+Iz\_ref$$

$$IN\_R\_ref=(\tfrac{1}{2})\times IAC\_R\_ref-Iz\_ref$$

$$IN\_S\_ref=(\tfrac{1}{2})\times IAC\_S\_ref-Iz\_ref$$

$$IN\_T\_ref=(\tfrac{1}{2})\times IAC\_T\_ref-Iz\_ref$$

According to the embodiment of FIG. 13, the direct current command (Iz_ref) on the MMC converter 39 side is fixed to 0, so that interference with the DC current command on the MMC converter 1 side can be avoided. Thus, there is an effect of achieving a stable AC variable speed motor.

Instead of the MMC converter 1 in FIG. 13, the MMC converter 34 of the second embodiment illustrated in FIG. 11 may be used.

Fourth Embodiment

Figure 14:
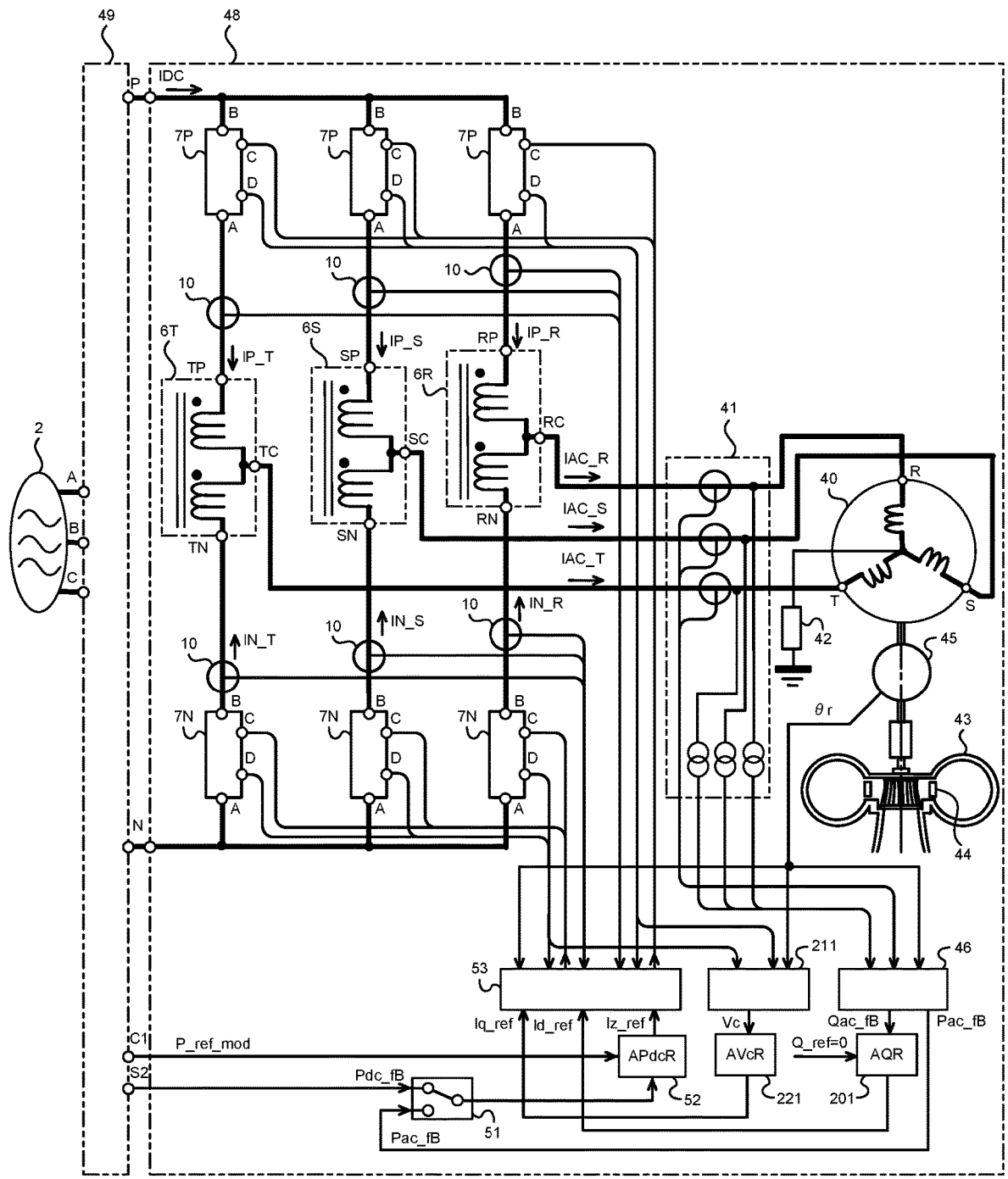
FIG. 14 is a diagram illustrating another circuit configuration of a third embodiment of a variable speed generator-motor according to the present invention.

FIG. 14 is a diagram illustrating a circuit configuration of a fourth embodiment relating to a variable speed generator-motor using an MMC converter 49 and an MMC converter 48 according to the present invention. In FIG. 14, the same components as those of the MMC converter 39 according to the third embodiment illustrated in FIG. 13 are denoted by the same reference numerals. The same components as those of the MMC converter 39 will not be described in order to avoid duplication.

Figure 15:
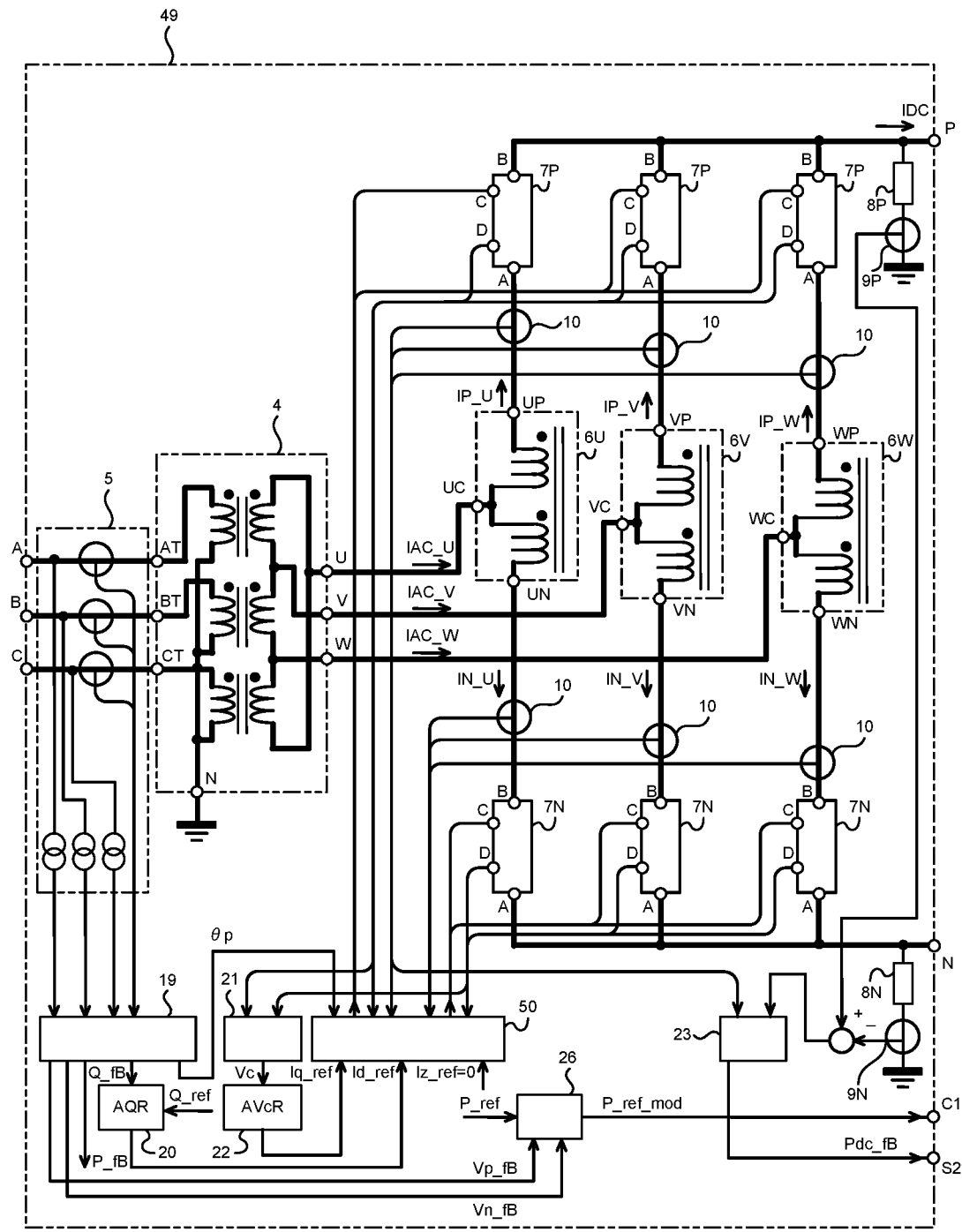
FIG. 15 is a diagram illustrating a circuit configuration of an AC system-side MMC converter included in the variable speed generator-motor in FIG. 14.

FIG. 15 illustrates the MMC converter 49 that is a part of FIG. 14. In FIG. 15, the same components as those of the M2C converter 1 according to the first embodiment illustrated in FIG. 1 are denoted by the same reference numerals. The same components as those of the MMC converter 1 will not be described in order to avoid duplication.

With the above configuration, a converter current control device 50 illustrated in FIG. 15 receives detection currents (IP_U, IP_V, IP_W, IN_U, IN_V, and IN_W) of the current transformers 10, and calculates AC currents (IAC_U, IAC_V, and IAC_W) and through currents (IPN_U, IPN_V, and IPN_W) flowing from the negative-side arms 7N to the positive-side arms 7P of the respective phases.

In the fourth embodiment, the DC current command is fixed to (Iz_ref=0).

The relationship between the current command values (Id_ref and Iq_ref), the AC current commands (IAC_U_ref, IAC_V_ref, and IAC_W_ref), and the positive phase (ep) is expressed by Mathematical formula (2) described above.

The DC power (Pdc_fB) detected by the DC power detector 23 is output to the MMC converter 48 in FIG. 14 via an external terminal (S2). The correction command (P_ref_mod) output from the power command limiter 26 is output to the MMC converter 48 in FIG. 14 via an external terminal (C1).

In the MMC converter 48 of FIG. 14, reference numeral 51 denotes a switch that selects an AC end active power (Pac_fB) or a DC end active power (Pdc_fB) received via the connection terminal (S2), and outputs the selected active power to a DC active power adjustment unit (APdcR) 52.

The DC active power adjustment unit (APdcR) 52 calculates a DC current command (Iz_ref) such that the detection value from the switch 51 becomes a set value (P_ref_mod), and outputs the DC current command (Iz_ref) to the converter current control device 53.

The converter current control device 53 receives detection currents (IP_R, IP_S, IP_T, IN_R, IN_S, and IN_T) of the current transformers 10, and calculates AC currents (IAC_R, IAC_S, and IAC_T) and through currents (IPN_R, IPN_S, and IPN_T) flowing from the negative-side arms 7N to the positive-side arms 7P of the respective phases.

The relationship between the current command values (Id_ref, Iq_ref, and Iz_ref), the AC current commands (IAC_R_ref, IAC_S_ref, and IAC_T_ref) and the rotation phase (Or) is expressed by Mathematical formula (4) described above.

According to the embodiment of FIGS. 14 and 15, the direct current command (Iz_ref) on the MMC converter 49 side is fixed to 0, so that interference with the DC current command on the MMC converter 48 side can be avoided. Thus, there is an effect of achieving a stable AC variable speed motor, and at the same time, an effect that the operation can be stably performed against the disturbance from the pump turbine side directly connected to the rotation shaft since the active power output of the AC rotary electric machine 40 upstream of the energy flow is controlled particularly during the power generation operation.

Fifth Embodiment

Figure 16:
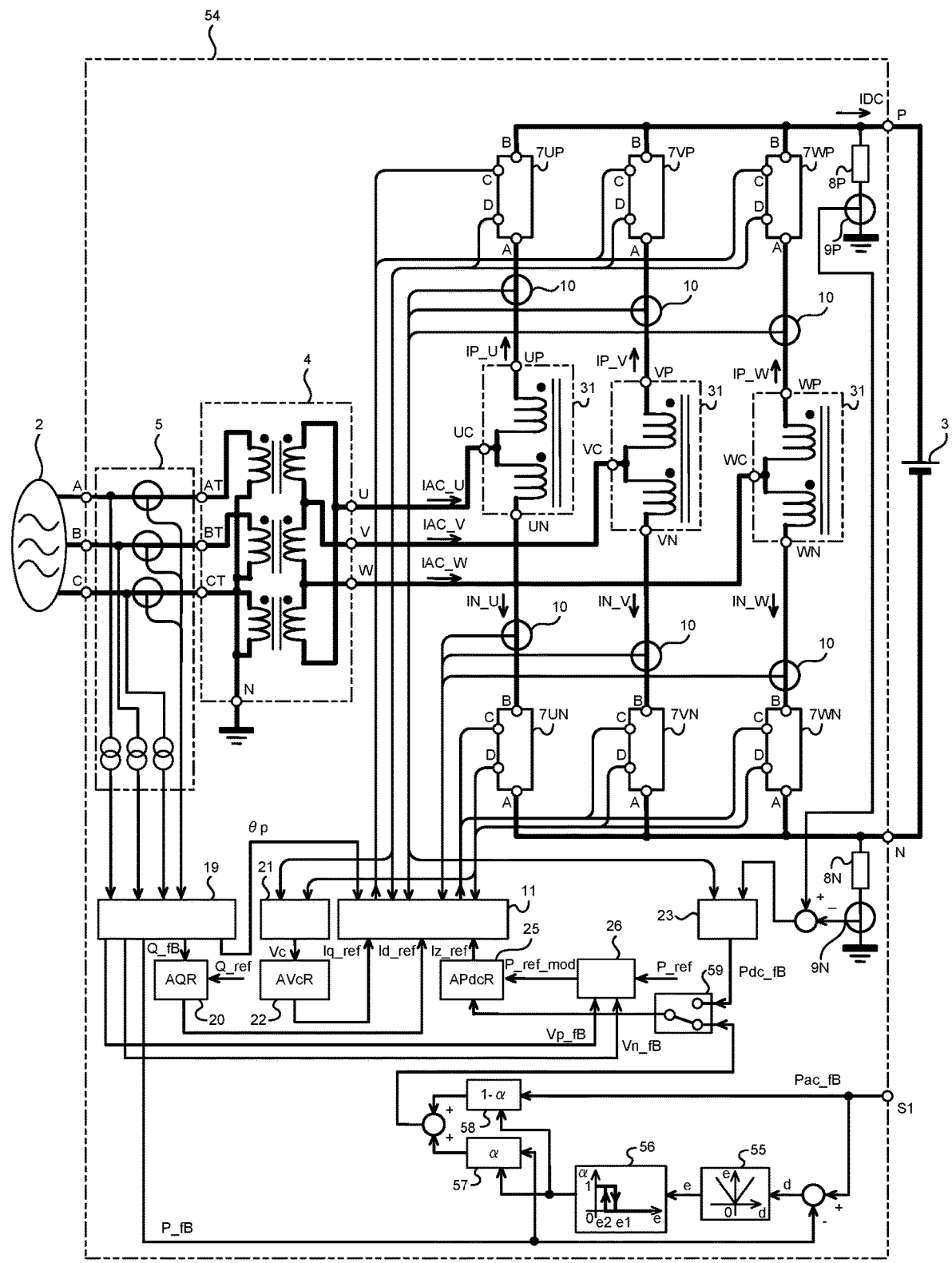
FIG. 16 is a diagram illustrating a configuration of an active power control circuit according to the first embodiment and the third embodiment.

FIG. 16 is a diagram illustrating a circuit configuration of a fifth embodiment of an MMC converter 54 according to the present invention. In FIG. 16, the same components as those of the MMC converter 1 according to the first embodiment illustrated in FIG. 1 are denoted by the same reference numerals. The same components as those of the MMC converter 1 will not be described in order to avoid duplication.

Reference numeral 55 denotes an absolute value calculation unit that receives a difference signal d obtained by comparing the AC side active power Pac_fB received via the external terminal (S1) with the first terminal side active power P_fB of the unit transformer 4 detected by the AC signal calculation unit 19, and outputs an absolute value e thereof. As the AC side active power Pac_fB, the output of the AC signal calculation unit 46 described above is used.

Reference numeral 56 denotes an output switch that outputs α=1 in a normal state. When the input signal e exceeds a set value e1, the output switch outputs α=0. When the input signal e falls below the set value e2, the output switch outputs α=1 again.

Reference numerals 57 and 58 denote gains set to α and (1−α), respectively. When α=1, the gain 57 selectively outputs the first terminal side active power P_fB of the unit transformer 4 through an adder, and when α=0, the gain 58 selectively outputs the AC side active power Pac_fB through the adder, and the active power is input to the switch 59.

The set value e1 of the output switch 56 is set to a value larger than the input signal e during the normal operation. The input signal e corresponds to the loss of the MMC converter connected back-to-back to the MMC converter 54.

In the present embodiment, the set value e1 is set to 0.1 times the rated active power of the MMC converter 54 and the set value e2 is set to 0.05 times in order to make the input signal e exceed the set value in the event of fault propagation of the AC system 2 occurs and then cause switching to the active power control by the AC side active power Pac_fB.

According to the embodiment of FIG. 16, the active power is controlled by the active power measured at the first terminal of the unit transformer 4 during the normal operation, so that the active power command from the outside can be adjusted with high accuracy. In addition, there is an effect of stably continuing the operation of the MMC converter due to the active power control by the AC end active power of the AC rotary electric machine 40 or the like in the event of system fault propagation.

REFERENCE SIGNS LIST

1, 34, 39, 48, 49, 54, 60 MMC converter
2 AC system
3 DC power supply
4 unit transformer
5, 41 signal transformer
6, 6U, 6V, 6W, 6R, 6S, 6T three-terminal reactor
7P, 7UP, 7VP, 7WP positive-side arm
7N, 7UN, 7VN, 7WN negative-side arm
8, 8P, 8N, 42 high resistor
9, 9P, 9N, 10 current transformer
11, 47, 50, 53 converter current control device
12 half-bridge circuit
13H, 13L self-arc-extinguishing element
14H, 14L anti-parallel diode
15 capacitor
16H, 16L gate drive unit
17 voltage detector
18 signal converter
19, 46 AC signal calculation unit
20, 70, 201 reactive power adjustment unit
21, 211 capacitor voltage detector
22, 221 capacitor voltage adjustment unit
23 DC power detector
24, 51, 59, 69 switch
25, 52, 67 DC active power adjustment unit
26 power command limiter
27, 29, 57, 58, 64, 65, 75, 76 gain
28, 36 positive-phase limiter
30, 33, 37 negative-phase limiter
31, 38 low value selection circuit
32, 321 limiter
35 current command limiter
40 AC rotary electric machine
43 pump turbine
44 guide vane
45 rotation phase detector
55 absolute value calculation unit
56 output switch
61 MMC converter energy detector
62 host control device
63 converter energy adjustment unit
66 AC active power adjustment unit
71, 72, 73, 74 switch

The invention claimed is:

1. A modular multilevel power converter connected between a positive-side terminal (P terminal) and a negative-side terminal (N terminal) of a DC power supply and three-phase AC terminals (U terminal, V terminal, and W terminal) of an AC system, including:
three two-terminal arms (UP arm, VP arm, and WP arm) between the positive-side terminal and the three-phase AC terminals and three two-terminal arms (UN arm, VN arm, and WN arm) between the negative-side terminal and the three-phase AC terminals, the two-terminal arms each including K (K is a natural number of 1 or more) two-terminal unit converters connected in series each are capable of outputting any voltage via an energy storage element having a voltage source characteristic;
an inductive element including two-terminal coils between the three two-terminal arms on a side of the positive-side terminal, the three two-terminal arms on a side of the negative-side terminal, and the three-phase AC terminals;
six arm current transformers that detect currents of the three arms on the side of the positive-side terminal and the three arms on the side of the negative-side terminal;
an AC current transformer that detects or calculates AC currents (IU, IV, and IW) flowing through the three-phase AC terminals;
a voltage transformer of the three-phase AC terminals;
a DC current transformer that detects or calculates a current (IDC) flowing through the positive-side terminal of the DC power supply;
an AC current calculator that calculates and outputs an active current component and a reactive current component from a signal of the AC current transformer;
an AC current adjuster that calculates an AC voltage command for each of AC three phases to make calculation outputs of the active current component and the reactive current component match a command value, divides the AC voltage command into two components, and outputs the components;
a DC current adjuster that calculates one DC voltage command to make a current signal from the DC current transformer match a command value, divides the DC voltage command into six components, and outputs the components; and
a modulation factor calculator that performs addition or subtraction of the AC voltage command and the DC voltage command and outputs a modulation factor to pulse width modulation devices included in the three arms on the side of the positive-side terminal and the three arms on the side of the negative-side terminal,
the modular multilevel power converter comprising:
a capacitor average voltage detector that detects or calculates an average voltage of (6×k) capacitors included in the modular multilevel power converter;
a capacitor voltage adjuster that calculates an active current component command to make the capacitor average voltage detection value match a command value and outputs the active current component command to the AC current adjuster;
an active power detector that receives a current signal from the AC current transformer and a voltage signal from an AC voltage transformer, and calculates and outputs an active power;
an active power adjuster that calculates and outputs a DC current command value to the DC current adjuster to make the active power detection value match an active power command value;
a positive-phase voltage detector that calculates a positive-phase voltage amplitude from a three-phase voltage signal of the AC voltage transformer;
a first level detector that switches an output level from 0 to 1 when the positive-phase voltage amplitude becomes equal to or less than a first set value and switches an output level from 1 to 0 when the positive-phase voltage amplitude becomes equal to or more than a second set value;
a first active power command suppressor that suppresses an absolute value of an active power command value to the DC current adjuster to 0 or a first limit value that is 0.2 times a rated DC current or less in a period in which the output level of the first level detector is 1;
a negative-phase voltage detector that calculates a negative-phase voltage amplitude from a three-phase voltage signal of the AC voltage transformer;

a second level detector that switches an output level from 0 to 1 when the negative-phase voltage amplitude becomes equal to or more than a third set value and switches an output level from 1 to 0 when the negative-phase voltage amplitude becomes equal to or less than a fourth set value; and a second active power command suppressor that suppresses an absolute value of an active power command value to the DC current adjuster to a second limit value that is 0.3 times a rated DC current or more and 0.7 times the rated DC current or less in a period in which the output level of the second level detector is 1.

2. A modular multilevel power converter connected between a positive-side terminal (P terminal) and a negative-side terminal (N terminal) of a DC power supply and three-phase AC terminals (U terminal, V terminal, and W terminal) of an AC system, including:

three two-terminal arms (UP arm, VP arm, and WP arm) between the positive-side terminal and the three-phase AC terminals and three two-terminal arms (UN arm, VN arm, and WN arm) between the negative-side terminal and the three-phase AC terminals, the two-terminal arms each including K (K is a natural number of 1 or more) two-terminal unit converters connected in series each are capable of outputting any voltage via an energy storage element having a voltage source characteristic;

an inductive element including two-terminal coils between the three two-terminal arms on a side of the positive-side terminal, the three two-terminal arms on a side of the negative-side terminal, and the three-phase AC terminals;

six arm current transformers that detect currents of the three arms on the side of the positive-side terminal and the three arms on the side of the negative-side terminal;

an AC current transformer that detects or calculates AC currents (IU, IV, and IW) flowing through the three-phase AC terminals;

a voltage transformer of the three-phase AC terminals;

a DC current transformer that detects or calculates a current (IDC) flowing through the positive-side terminal of the DC power supply;

an AC current calculator that calculates and outputs an active current component and a reactive current component from a signal of the AC current transformer;

an AC current adjuster that calculates an AC voltage command for each of AC three phases to make calculation outputs of the active current component and the reactive current component match a command value, divides the AC voltage command into two components, and outputs the components;

a DC current adjuster that calculates one DC voltage command to make a current signal from the DC current transformer match a command value, divides the DC voltage command into six components, and outputs the components; and a modulation factor calculator that performs addition or subtraction of the AC voltage command and the DC voltage command and outputs a modulation factor to pulse width modulation devices included in the three arms on the side of the positive-side terminal and the three arms on the side of the negative-side terminal, the modular multilevel power converter comprising:

a capacitor average voltage detector that detects or calculates an average voltage of (6×k) capacitors included in the modular multilevel power converter;

a capacitor voltage adjuster that calculates an active current component command to make the capacitor average voltage detection value match a command value and outputs the active current component command to the AC current adjuster;

an active power detector that receives a current signal from the AC current transformer and a voltage signal from an AC voltage transformer, and calculates and outputs an active power;

an active power adjuster that calculates and outputs a DC current command value from the DC current adjuster to make the active power detection value match an active power command value;

a positive-phase voltage detector that calculates a positive-phase voltage amplitude from a three-phase voltage signal of the AC voltage transformer;

a first level detector that switches an output level from 0 to 1 when the positive-phase voltage amplitude becomes equal to or less than a first set value and switches an output level from 1 to 0 when the positive-phase voltage amplitude becomes equal to or more than a second set value;

a first DC current command suppressor that suppresses an absolute value of a DC current command value to the DC current adjuster to 0 or a first limit value that is 0.2 times a rated DC current or less in a period in which the output level of the first level detector is 1;

a negative-phase voltage detector that calculates a negative-phase voltage amplitude from a three-phase voltage signal of the AC voltage transformer;

a second level detector that switches an output level from 0 to 1 when the negative-phase voltage amplitude becomes equal to or more than a third set value and switches an output level from 1 to 0 when the negative-phase voltage amplitude becomes equal to or less than a fourth set value; and a second DC current command suppressor that suppresses an absolute value of a DC current command value to the DC current adjuster to a second limit value that is 0.3 times a rated DC current or more and 0.7 times the rated DC current or less in a period in which the output level of the second level detector is 1.

3. The modular multilevel power converter according to claim 1, wherein a voltage pulsation factor of an AC system frequency of the capacitor is defined by (maximum voltage value−minimum voltage value)/(maximum voltage value+minimum voltage value), and the voltage pulsation factor exceeds 10% when rated active power is output.

4. A variable speed generator-motor comprising the modular multilevel power converter according to claim 1 as a first modular multilevel power converter, wherein AC rotary electric machine is connected to an AC end of a second modular multilevel power converter connected back-to-back to a DC end of the first modular multilevel power converter.

5. The modular multilevel power converter according to claim 2, wherein a voltage pulsation factor of an AC system frequency of the capacitor is defined by (maximum voltage value−minimum voltage value)/(maximum voltage value+minimum voltage value), and the voltage pulsation factor exceeds 10% when rated active power is output.

6. A variable speed generator-motor comprising the modular multilevel power converter according to claim 2 as a first modular multilevel power converter, wherein AC rotary electric machine is connected to an AC end of a second modular multilevel power converter connected back-to-back to a DC end of the first modular multilevel power converter.

\* \* \* \* \*

UNITED STATES PATENT AND TRADEMARK OFFICE
CERTIFICATE OF CORRECTION

PATENT NO. : 12,289,063 B2  
APPLICATION NO. : 18/026111  
DATED : April 29, 2025  
INVENTOR(S) : Bando et al.

It is certified that error appears in the above-identified patent and that said Letters Patent is hereby corrected as shown below:

On the Title Page  
Item (73) Assignee, Please change "HITACHI, LTD." To -- Hitachi, Ltd. --.

Signed and Sealed this  
Twenty-seventh Day of May, 2025

Coke Morgan Stewart  
*Acting Director of the United States Patent and Trademark Office*